United States Patent
Constantinof et al.

(10) Patent No.: US 8,600,006 B2
(45) Date of Patent: Dec. 3, 2013

(54) VOICE CONTINUITY AMONG USER TERMINALS

(75) Inventors: Cristian Constantinof, Kanata (CA); Dany Sylvain, Gatineau (CA)

(73) Assignee: Genband US LLC, Plano, TX (US)

(*) Notice: Subject to any disclaimer, the term of this patent is extended or adjusted under 35 U.S.C. 154(b) by 1797 days.

(21) Appl. No.: 11/616,679

(22) Filed: Dec. 27, 2006

(65) Prior Publication Data
US 2008/0160991 A1    Jul. 3, 2008

(51) Int. Cl.
*H04M 1/24* (2006.01)
*H04M 3/08* (2006.01)
*H04M 3/22* (2006.01)

(52) U.S. Cl.
USPC .... 379/15.03; 379/70; 379/88.17; 379/93.21; 379/212.01; 455/439; 455/417

(58) Field of Classification Search
USPC ............. 379/15.03, 70, 88.17, 93.21, 212.01; 455/439, 417
See application file for complete search history.

(56) References Cited

U.S. PATENT DOCUMENTS

| | | | |
|---|---|---|---|
| 5,497,411 A | 3/1996 | Pellerin | |
| 5,978,367 A | 11/1999 | Kinnunen et al. | |
| 6,067,453 A | 5/2000 | Adiwoso et al. | |
| 6,208,627 B1 | 3/2001 | Menon et al. | |
| 6,353,596 B1 | 3/2002 | Grossglauser et al. | |
| 6,614,897 B1 * | 9/2003 | Curtis et al. | 379/210.01 |
| 6,721,565 B1 | 4/2004 | Ejzak et al. | |
| 6,801,615 B2 | 10/2004 | Stumer et al. | |
| 6,961,774 B1 | 11/2005 | Shannon et al. | |
| 6,970,459 B1 | 11/2005 | Meier | |
| 6,999,770 B2 | 2/2006 | Hirsbrunner et al. | |
| 7,099,309 B2 | 8/2006 | Davidson | |
| 7,206,582 B2 * | 4/2007 | Tom et al. | 455/445 |
| 7,313,666 B1 | 12/2007 | Saminda De Silva et al. | |
| 7,395,065 B2 * | 7/2008 | Dorenbosch | 455/436 |

(Continued)

FOREIGN PATENT DOCUMENTS

| | | |
|---|---|---|
| CA | 2 501 991 A1 | 4/2004 |
| CN | 101292489 A | 11/2008 |

(Continued)

OTHER PUBLICATIONS

Translation of WO 2006-105372 (A1) by Zhu provided by PTO.*

(Continued)

*Primary Examiner* — Lisa Hashem
(74) *Attorney, Agent, or Firm* — Jenkins, Wilson, Taylor & Hunt, P.A.

(57) ABSTRACT

The present invention moves service control, including call control, for a user element from any number of subsystems to a multimedia subsystem (MS). Call control for originating or terminating a call in any subsystem as well as transferring the call between user elements is anchored at a continuity control function (CCF) in the MS. A call may be transferred by the CCF from a first user element to a second user element in the same or different subsystems upon receiving a request from the second user element. A user may invoke a transfer from the first user element to the second user element by having the second user element send an appropriate request to the CCF. The request may be provided to the CCF by initiating a call from the second user element that is intended for the CCF, when the call with the first user element is active.

20 Claims, 14 Drawing Sheets

(56) References Cited

U.S. PATENT DOCUMENTS

| | | |
|---|---|---|
| 7,477,734 B1 | 1/2009 | Smith |
| 7,492,886 B1* | 2/2009 | Kalmanek et al. ........ 379/220.01 |
| 7,664,495 B1 | 2/2010 | Bonner et al. |
| 7,729,489 B2* | 6/2010 | Lee et al. .................. 379/212.01 |
| 7,792,974 B2 | 9/2010 | Westman et al. |
| 8,045,568 B2 | 10/2011 | Sylvain et al. |
| 8,180,338 B1 | 5/2012 | Sylvain |
| 8,203,982 B2 | 6/2012 | Mutikainen et al. |
| 8,208,442 B2 | 6/2012 | Mahdi et al. |
| 8,411,673 B2* | 4/2013 | Jin et al. ........................ 370/352 |
| 2001/0055982 A1 | 12/2001 | Umeda |
| 2002/0037723 A1 | 3/2002 | Roach |
| 2002/0133600 A1 | 9/2002 | Williams et al. |
| 2002/0188562 A1 | 12/2002 | Igarashi et al. |
| 2003/0027569 A1 | 2/2003 | Ejzak |
| 2003/0148765 A1* | 8/2003 | Ma et al. ....................... 455/438 |
| 2003/0174688 A1 | 9/2003 | Ahmed et al. |
| 2004/0002335 A1 | 1/2004 | Pan et al. |
| 2004/0003046 A1 | 1/2004 | Grabelsky et al. |
| 2004/0028080 A1 | 2/2004 | Samarasinghe et al. |
| 2004/0062383 A1 | 4/2004 | Sylvain |
| 2004/0067754 A1 | 4/2004 | Gao et al. |
| 2004/0157600 A1 | 8/2004 | Stumpert et al. |
| 2004/0219905 A1 | 11/2004 | Blumenthal et al. |
| 2004/0246990 A1 | 12/2004 | Krishnamurthi et al. |
| 2004/0249887 A1 | 12/2004 | Garcia-Martin et al. |
| 2004/0266426 A1 | 12/2004 | Marsh et al. |
| 2005/0002407 A1 | 1/2005 | Shaheen et al. |
| 2005/0003797 A1 | 1/2005 | Baldwin |
| 2005/0003821 A1* | 1/2005 | Sylvain ......................... 455/444 |
| 2005/0243870 A1* | 11/2005 | Balogh et al. ................. 370/522 |
| 2005/0245261 A1* | 11/2005 | Ejzak ............................. 455/436 |
| 2005/0265304 A1 | 12/2005 | Kim et al. |
| 2005/0286531 A1 | 12/2005 | Tuohino et al. |
| 2006/0002355 A1 | 1/2006 | Baek et al. |
| 2006/0002380 A1 | 1/2006 | Bollinger et al. |
| 2006/0034270 A1 | 2/2006 | Haase et al. |
| 2006/0035637 A1 | 2/2006 | Westman |
| 2006/0077965 A1 | 4/2006 | Garcia-Martin et al. |
| 2006/0083199 A1 | 4/2006 | Yang |
| 2006/0087982 A1 | 4/2006 | Kuure et al. |
| 2006/0094431 A1 | 5/2006 | Saifullah et al. |
| 2006/0111114 A1 | 5/2006 | Marin et al. |
| 2006/0142004 A1 | 6/2006 | He et al. |
| 2006/0187904 A1 | 8/2006 | Oouchi |
| 2006/0198360 A1 | 9/2006 | Biage et al. |
| 2006/0209805 A1* | 9/2006 | Mahdi et al. ................... 370/352 |
| 2006/0217112 A1 | 9/2006 | Mo |
| 2006/0268928 A1 | 11/2006 | Barzegar et al. |
| 2007/0004415 A1 | 1/2007 | Abedi |
| 2007/0014281 A1 | 1/2007 | Kant |
| 2007/0041367 A1 | 2/2007 | Mahdi |
| 2007/0058788 A1 | 3/2007 | Mahdi et al. |
| 2007/0066304 A1 | 3/2007 | Lee |
| 2007/0072605 A1 | 3/2007 | Poczo |
| 2007/0100981 A1 | 5/2007 | Adamczyk et al. |
| 2007/0127436 A1* | 6/2007 | Karimi-Cherkandi et al. .............. 370/352 |
| 2007/0153736 A1 | 7/2007 | Mow et al. |
| 2007/0206568 A1 | 9/2007 | Silver et al. |
| 2007/0263599 A1 | 11/2007 | Itzkovitz et al. |
| 2008/0025263 A1 | 1/2008 | Pelkonen |
| 2008/0049725 A1 | 2/2008 | Rasanen |
| 2008/0144518 A1* | 6/2008 | Rosenwald et al. .......... 370/250 |
| 2008/0144637 A1 | 6/2008 | Sylvain et al. |
| 2008/0151870 A1* | 6/2008 | Stucker et al. ................ 370/352 |
| 2008/0160991 A1* | 7/2008 | Constantinof et al. ..... 455/426.2 |
| 2008/0268818 A1 | 10/2008 | Keller et al. |
| 2008/0299980 A1 | 12/2008 | Buckley et al. |
| 2009/0111471 A1* | 4/2009 | Li et al. ......................... 455/437 |
| 2009/0190579 A1 | 7/2009 | Witzel et al. |
| 2009/0219843 A1 | 9/2009 | Chin et al. |
| 2009/0219924 A1* | 9/2009 | Watanabe et al. ............. 370/352 |
| 2009/0227236 A1 | 9/2009 | Sanchez Herrero et al. |
| 2010/0124897 A1* | 5/2010 | Edge ........................... 455/404.1 |
| 2011/0176680 A1* | 7/2011 | Wu ................................ 380/277 |
| 2011/0181681 A1* | 7/2011 | Lee ............................. 348/14.02 |
| 2013/0039337 A1* | 2/2013 | Hwang et al. ................. 370/331 |

FOREIGN PATENT DOCUMENTS

| | | |
|---|---|---|
| CN | 102138311 A | 7/2011 |
| CN | 200680039435 | 3/2013 |
| EP | 1 920 572 A2 | 3/2007 |
| EP | 1816877 A1 | 8/2007 |
| EP | 1 965 592 A1 | 9/2008 |
| GB | 2 410 855 A | 8/2005 |
| WO | WO 00/60785 A1 | 10/2000 |
| WO | WO 01/03450 A1 | 1/2001 |
| WO | WO 01/22657 A1 | 3/2001 |
| WO | WO 2004/019173 A2 | 3/2004 |
| WO | WO 2004/073279 A1 | 8/2004 |
| WO | WO 2004/112415 A2 | 12/2004 |
| WO | WO 2006/097837 A1 | 9/2006 |
| WO | 2006105732 A1 | 10/2006 |
| WO | WO 2006/126072 A1 | 11/2006 |
| WO | WO 2007/023358 A2 | 3/2007 |
| WO | WO 2008/038101 A2 | 4/2008 |

OTHER PUBLICATIONS

Official Action for U.S. Appl. No. 11/536,921, filed Dec. 3, 2010.
Final Official Action for U.S. Appl. No. 11/466,115, filed Oct. 12, 2010.
Official Action for U.S. Appl. No. 11/378,776, filed Aug. 18, 2010.
Official Action for U.S. Appl. No. 11/440,165, filed Aug. 4, 2010.
Final Official Action for U.S. Appl. No. 11/536,921, filed Mar. 4, 2010.
Official Action for U.S. Appl. No. 11/466,115, filed Feb. 2, 2010.
Official Action for U.S. Appl. No. 11/536,921, filed Jul. 21, 2009.
Official Action for U.S. Appl. No. 11/466,115, filed Jun. 23, 2009.
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0 (Dec. 2008).
International Search Report for PCT/IB2007/002787 (Mar. 7, 2008).
Notification Concerning Transmittal of International Preliminary Report on Patentability for International Application No. PCT/IB2006/002282 (Mar. 6, 2008).
International Search Report for PCT/IB2006/002282 (Feb. 2, 2007).
International Search Report for PCT/IB2006/001564, Mailed Nov. 14, 2006).
International Search Report for PCT/UB2006/001362 (Oct. 5, 2006).
International Search Report for PCT/IB2006/000607 (Aug. 28, 2006).
3GPP, "3rd Generation Partnership Project; Technical Specification Group Services and System Aspects; Voice Call Continuity Between CS and IMS; Stage 2 (Release 7)," 3GPP TS 23.206 V1.1.0 (Jul. 2006).
3GPP, "3rd Generation Partnership Project; Technical Specification Group Services and System Aspects; Multimedia Broadcast/Multicast Service (MBMS); Architecture and Functional Description (Release 6)," 3GPP TS 23.246 V6.10.0 (Jun. 2006).
3GPP, "3rd Generation Partnership Project; Technical Specification Group Services and System Aspects; Voice Call Continuity Between CS and IMS Study (Release 7)," 3GPP TR 23.806 V1.4.0 (Aug. 2005).
U.S. Appl. No. 60/690,843, filed Jun. 15, 2005.
Strater et al., "Seamless Mobility Between Home Networks and Cable Service," Motorola White Paper (May 27, 2005).
3GPP, "3rd Generation Partnership Project; Universal Mobile Telecommunications System; Mobile Radio Interface Layer 3 Specification, Core Network Protocols—Stage 3," TS 24.008 V3.0.0 (Jul. 1999).
Final Office Action for U.S. Appl. No. 12/209,829, filed Jun. 6, 2013.
First Office Action for Chinese Patent Application No. 200780043894.0 (May 31, 2013).
Non-Final Office Action for U.S. Appl. No. 11/554,930, filed Mar. 18, 2013.

(56) References Cited

OTHER PUBLICATIONS

Notice of Abandonment for U.S. Appl. No. 11/440,165, filed Feb. 5, 2013.
Interview Summary for U.S. Appl. No. 11/378,776, filed Nov. 30, 2012.
"3rd Generation Partnership Project; Technical Specification Group Services and System Aspects; Voice Call Continuity between CS and IMS; Stage 2 (Release 7)," 3GPP TS 23.206 V0.3.0, pp. 1-22 (Feb. 2006).
"Architectural Alternative for CS-IMS Voice Call Continuity Based on IMS Control," Nortel, 3GPP TSG SA WG2 Architecture—S2#45, pp. 1-9 (Apr. 4-8, 2005).
"WID for Voice Call Continuity Between CS and IMS (incl. I-WLAN)," TSG SA WG2, Technical Specification Group Services and System Aspects, pp. 1-5 (Mar. 14-17, 2005).
Notice of Abandonment for U.S. Appl. No. 11/466,115, filed May 11, 2011.
Notice of Abandonment for U.S. Appl. No. 11/452,743, filed Apr. 27, 2011.
Chinese Official Action for Chinese patent application No. 200680039435.0 (Mar. 22, 2011).
Final Official Action for U.S. Appl. No. 11/378,776, filed Mar. 9, 2011.
Official Action for U.S. Appl. No. 11/440,165, filed Feb. 16, 2011.
Non-Final Official Action for U.S. Appl. No. 11/452,743, filed Oct. 13, 2010.
Final Official Action for U.S. Appl. No. 11/452,743, filed Mar. 30, 2010.
Non-Final Official Action for U.S. Appl. No. 11/452,743, filed Oct. 2, 2009.
Commonly-assigned, co-pending U.S. Appl. No. 11/452,743 for "Selective Call Anchoring in a Multimedia Subsystem," (Unpublished, filed Jun. 14, 2006).
"3rd Generation Partnership Project; Technical Specification Group Core Network and Terminals; Mobile radio interface Layer 3 specification; Core network protocols; Stage 3 (Release 7)," 3GPP TS 24.008, V7.4.0, pp. 1-534 (Jun. 2006).
Official Action for U.S. Appl. No. 11/466,115, filed Jul. 12, 2011.
Non-Final Official Action for U.S. Appl. No. 11/554,930, filed Jul. 7, 2009.
Notice of Allowance and Fee(s) Due for U.S. Appl. No. 11/536,921, filed Jun. 30, 2011.
Decision on Petition to Revive for U.S. Appl. No. 11/466,115, filed Jun. 28, 2011.
Decision on Petition to Revive for U.S. Appl. No. 11/452,743, filed Jun. 22, 2011.
Final Official Action for U.S. Appl. No. 11/440,165 (Jun. 22, 2011).
Notice of Panel Decision from Pre-Appeal Brief Review for U.S. Appl. No. 11/554,930, filed Apr. 19, 2011.
Final Official Action for U.S. Appl. 11/554,930, filed Dec. 3, 2010.
Non-Final Official Action for U.S. Appl. No. 11/554,930, filed Apr. 14, 2010.
Final Official Action for U.S. Appl. No. 11/554,930, filed Sep. 2, 2009.
Non-Final Official Action for U.S. Patent Application U.S. Appl. No. 11/554,930, filed Feb. 6, 2009.
Commonly-assigned, co-pending U.S. Appl. No. 12/209,829 for "Adding Channel After Service Control Channel After Session Establishment," (Unpublished, filed Sep. 12, 2008).
3RD Generation Partnership Project (3GPP), "IP Multimedia Subsystem (IMS) Centralized Services," Technical Specification 3GPP TS 23.292 v8.0.0, Stage 2, Release 3GPP Organizational Partners (Jun. 2008).
3GPP, "3rd Generation Partnership Project; Technical Specification Group Services and System Aspects; IP Miltimedia Subsystem (IMS) Centralized Services (Release 8)," 3GPP TS 23.892 V8.0.1 (Mar. 2008).
3GPP, "3rd Generation Partnership Project; Technical Specification Group Services and System Aspects; IP Miltimedia Subsystem (IMS); Stage 2 (Release 8)," 3GPP TS 23.228 V8.1.0 (Jun. 2007).

3GPP, "3rd Generation Partnership Project; Technical Specification Group Core Network and Terminals; Mobile Radio Interface Layer 3 Specification; Core Network Protocols; Stage (Release 7)," 3GPP TS 24.008 V7.8.0 (Jun. 2007).
"3rd Generatin Partnership Project; Technical Specification Group Core Network and Terminals; Mobile Radio Interface Layer 3 Specification; Core Network Protocols; Stage 3 (Release 7)," 3GPP TS 24.008 V7.5.0, pp. 1-538 (Sep. 2006).
"3rd Generation Partnership Project; Technical Specification Group Services and System Aspects; IP Multimedia Subsystem (IMS); Stage 2 (Release 7)," 3GPP TS 23.228 V7.5.0, pp. 1-214 (Sep. 2006).
3GPP TSG-SA WG2 Meeting #46, Technical Document: Tdoc S2-050995, Service Continuity—Network Domain Section (May 13, 2006).
Extended European Search Report for European Application No. 06795307.5 (Jan. 18, 2013).
Notice of Grant for Chinese Patent Application No. 200680039435.0 (Nov. 26, 2012).
Advisory Action for U.S. Appl. No. 11/378,776, filed Nov. 5, 2012.
Non-Final Official Action for U.S. Appl. No. 12/209,829, filed Sep. 5, 2012.
Extended European Search Report for European Application No. 06727330.0 (Jun. 27, 2012).
Office Action for Japanese Patent Application No. 2009-529788 (Jun. 5, 2012).
Final Office Action for U.S. Appl. No. 11/378,776, filed May 24, 2012.
Second Office Action for Chinese Patent Application No. 200680039435.0 (Mar. 27, 2012).
Applicant-Initiated Interview Summary for U.S. Appl. No. 11/554,930, filed Mar. 21, 2012.
Notice of Allowance and Fee(s) Due for U.S. Appl. No. 11/466,115, filed Feb. 21, 2012.
Non-Final Official Action for U.S. Appl. No. 11/378,776, filed Jan. 20, 2012.
Non-Final Official Action for U.S. Appl. No. 11/440,165, filed Jan. 19, 2012.
Final Official Action for U.S. Appl. No. 11/554,930, filed Dec. 2, 2011.
Non-Final Official Action for U.S. Appl. No. 12/209,829, filed Dec. 1, 2011.
Notice of Allowance and Fee(s) Due for U.S. Appl. No. 11/452,743, filed Nov. 7, 2011.
Notice of Panel Decision from Pre-Appeal Brief Review for U.S. Appl. No. 11/440,165, filed Nov. 3, 2011.
Interview Summary for U.S. Appl. No. 11/466,115, filed Oct. 18, 2011.
Communication pursuant to Article 94(3) EPC for European Application No. 07024903.2 (Apr. 2, 2009).
"3rd Generation Partnership Project; Technical Specification Group Services and System Aspects; Voice Call Continuity between CS and IMS Study (Release 7)," 3GPP TR 23.806, V1.5.0, pp. 1-148 (Aug. 2005).
3GPP SA WG2, "3rd Generation Partnership Project; Technical Specification Group Core Network and Terminals; Voice Call Continuity between the Circuit-Switched (CS) domain and the IP Multimedia (IP) Core Network (CN) subsystem; Stage 3 (Release 7), TS 24.206 V.7.0.0," Technical Specification (TS), Dec. 8, 2006, pp. 1-114, vol. 24.206 No. V7.0.0., 3GPP Organizational Partners' Publications Offices.
3GPP CT WG1, "3rd Generation Partnership Project; Technical Specification Group Services and System Aspects; Voice Call Continuity (VCC) between Circuit Switched (CS) and IP Multimedia Subsystem (IMS); Stage 2 (Release 7), TS 23.206 V7.1.0," Technical Specification (TS), Dec. 1, 2006, pp. 1-36, vol. 23.206 No. V7.1.0, 3GPP Organizational Partners' Publications Offices.
3GPP SA WG2, "Voice Call Continuity between CS and IMS Study (3GPP TR 23.806 version 7.0.0 Release 7)," Technical Specification (TS), Dec. 1, 2005, pp. 1-153, vol. 23.806 No. V7.0.0, 3GPP Organizational Partners' Publications Offices.
European Search Report for EP 07024903, Jul. 23, 2008.

* cited by examiner

VOICE CONTINUITY AMONG USER TERMINALS

FIELD OF THE INVENTION

The present invention relates to communications, and in particular to providing a centralized control function for supporting the transfer of calls from one user terminal to another.

BACKGROUND OF THE INVENTION

Packet communications have evolved to a point where voice sessions, or calls, can be supported with essentially the same quality of service as that provided by circuit-switched communications. Packet communications are generally supported over packet subsystems, which were initially supported by local area networks, but are now supported by wireless local area networks (WLANs). Using WLAN access, user elements can support voice sessions using packet communications while moving throughout the WLAN. As such, WLAN access provides users the same freedom of movement within a WLAN as cellular access provides users within a cellular environment.

In many instances, the coverage areas provided by WLANs and cellular networks are complementary. For example, a WLAN may be established within a building complex in which cellular coverage is limited. Given the localized nature of WLAN coverage, cellular networks could bridge the coverage gaps between WLANs. Unfortunately, WLAN access technology is independent of cellular access technology. Cellular networks generally support circuit-switched communications, and WLANs support packet communications.

For various reasons, a user who is engaged in a call using a first user element would benefit from being able to easily transfer the call to a second user element, which is supported by the same or different access network. For example, a user engaged in a cellular call may wish to transition an active call from a cellular terminal to office, home, or other cellular terminals due to coverage issues or a dying battery. Since these terminals are often supported by different types of networks, such as cellular networks and WLANs, or networks that do not internally support the transfer of active calls, the user is generally faced with initiating a new call to change from one user terminal to another.

For networks that do support transfers from one user terminal to another, the call is parked and then picked up by the new user terminal. Such functionality is generally relegated within a dedicated enterprise network controlled by a private branch exchange. As such, calls cannot be transferred to another network that is outside of the enterprise network. The park and pickup process for transferring calls from one user terminal to another is cumbersome and injects a significant interruption in the conversation. In operation, the transferring user must place the call on hold, dial the number for the new user element to which the call is being transferred, and then wait for the new user terminal to ring before answering the call.

Accordingly, there is a need for a technique to effectively transfer calls from one user element to another. There is a further need to be able to transfer calls from a user element in a first domain to a user element in a second domain, as well as transfer calls between user elements in an efficient manner within a given domain.

SUMMARY OF THE INVENTION

The present invention moves service control, including call control, for a user element from any number of subsystems to a multimedia subsystem (MS), such as the Internet Protocol (IP) Multimedia Subsystem (IMS). As such, call control is provided by the MS regardless of whether the user element is using cellular, LAN, WLAN, or Public Switched Telephone Network (PSTN) access for the call. Call control for originating or terminating a call in any subsystem as well as transferring the call between user elements is anchored at a continuity control function (CCF) in the MS. A call may be transferred by the CCF from a first user element to a second user element in the same or different subsystems upon receiving a request from the second user element. A user may invoke a transfer from the first user element to the second user element by having the second user element send an appropriate request to the CCF. The request may be provided to the CCF by initiating a call from the second user element that is intended for the CCF, when the call with the first user element is active. Other techniques to initiate the request may include sending messages or signaling to the CCF via the first or second user element, with the CCF initiating the call toward the second user element to perform the call transfer.

Call transfers enable users to move calls from one user element to another, even when the user elements are served by different subsystems. To enable such transfers, the CCF may be inserted into the signaling path of the calls by a serving call/session control function (S-CSCF). To anchor the signaling path, the CCF may employ a back-to-back user agent function, which may operate as follows. When the first user element originates a call, the CCF will terminate an access signaling leg from the first user element and establish a remote signaling leg toward the remote endpoint. When terminating a call at the first user element, the CCF will terminate a remote signaling leg from the remote endpoint and establish an access signaling leg toward the first user element. Subsequently, the CCF will coordinate call signaling between the access signaling leg and the remote signaling leg for the call.

When the first user element is originating a call, the CCF appears as a service provided by an application server. In one embodiment, the CCF is invoked as the first service in a chain of services. When the first user element is terminating a call, the CCF is invoked as the last service in a chain of services. By locating the CCF with respect to the other services in this manner, other applications associated with the call are anchored by the CCF as part of the remote signaling leg of the call, and are therefore not impacted by transfers affecting the access signaling leg.

Upon receiving a transfer request from the user, the second user element will initiate a call to the CCF using an address for the CCF. The CCF will execute a transfer procedure by replacing the old access signaling leg for the first user element with the new access signaling leg for the second user element. The CCF will subsequently release the old access signaling leg for the first user element.

Switching the access signaling legs does not impact the remote signaling leg or the application services in the remote signaling leg. Through the new access signaling leg for the second user element and the remote signaling leg, the appropriate bearer path may be established between the second user element and the remote endpoint. Since all call signaling is provided through the CCF, additional services may be associated with the call through any number of transfers.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1A:
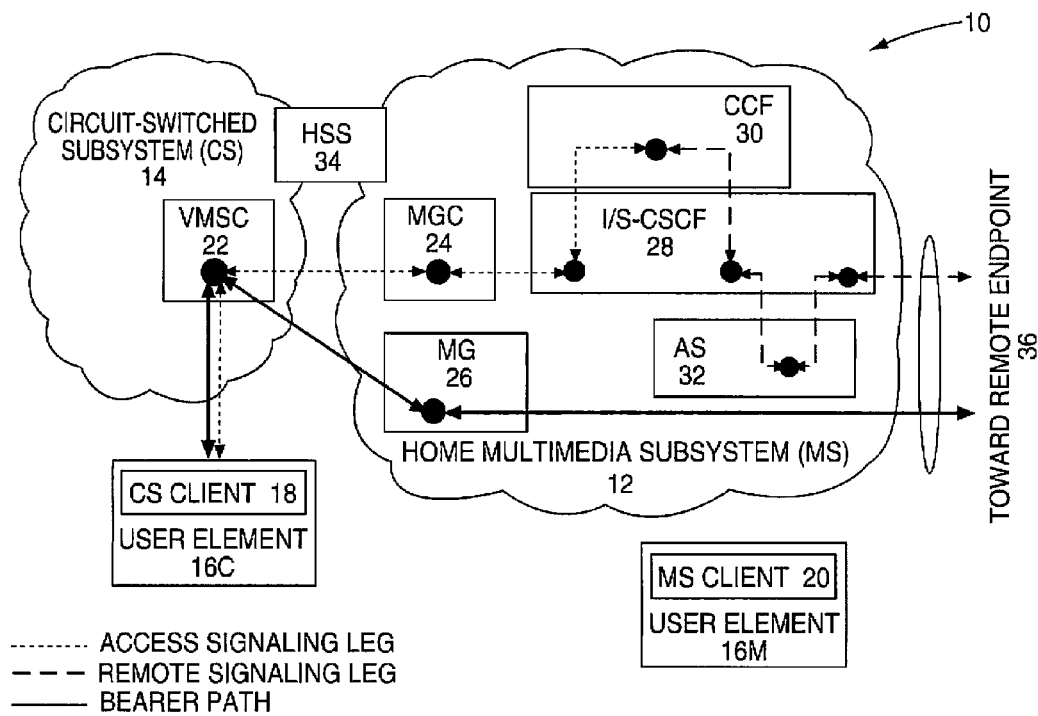
FIG. 1A is a communication environment illustrating circuit-switched subsystem access for a user element according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

For the present invention, service control, including call control, for a user element supported by a cellular, Public Switched Telephone Network (PSTN), or other circuit switched network is moved to a multimedia subsystem (MS), such as the Internet Protocol (IP) Multimedia Subsystem (IMS). Service control for user elements supported by packet-based subsystems is also provided by the MS. As such, call control for a call may be provided by the MS regardless of whether the user element is using cellular, PSTN, WLAN, or other access for the call. For clarity and conciseness, a network providing circuit-switched communications is referred to as a circuit-switched subsystem (CS), and a network providing packet communications is assumed to be part of or associated with the MS. For purposes of illustration only, cellular-based CSs and WLAN-based packet subsystems of the MS are used in the examples provided in the following description.

In the following embodiments, call control for originating and terminating calls in the CS or MS as well as transferring calls from one user element to another within a given subsystem or between different subsystems is anchored at a continuity control function (CCF) in the MS. Most, if not all, call signaling for the call is passed through the CCF. The CCF is a service provided in a home MS and anchors CS and MS calls to enable transfers from one user element to another within the CS or MS as well as across the CS and MS.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. In one embodiment, the CCF employs a Third Party Call Control function to provide call control in the CS. For MS calls, the CCF provides call control by interacting with the user element and a remote endpoint to establish a bearer path directly between the user element and the remote endpoint through the MS. The CCF is addressable using public service identities (PSI). In the CS, a directory number associated with the CCF is used for routing call signaling messages within the CS. In the MS, a uniform resource location (URL) associated with the CCF is used for routing call signaling messages within the MS. In the following description, 3GPP TS 24.008 (DTAP) is used in the CS, while the Session Initiation Protocol (SIP) is used in the MS to effect origination, termination, and transfer of calls. Those skilled in the art will recognize other applicable and useful protocols as substitutes for DTAP and SIP.

Turning now to FIG. 1A, a communication environment 10 is illustrated according to one embodiment of the present invention. In the communication environment 10, a home MS 12 and a CS 14 support communications for user element 16M and user element 16C, respectively. The user element 16C includes a CS client 18, which is configured to support circuit-switched communications via the CS 14. The user element 16M includes an MS client 20, which is configured to support packet communications via the home MS 12. For communications within the CS 14, a visited mobile switching center (VMSC) 22 will support circuit-switched communications for the user element 16C. The VMSC 22 may interact with the home MS 12 via a media gateway controller (MGC) 24 and an associated media gateway (MG) 26, both of which are affiliated with the home MS 12.

The home MS 12 may include various functions provided in one or more nodes. These functions include an interrogating and serving call/session control function (I/S-CSCF) 28, a CCF 30, an application server (AS) 32, and a home subscriber service (HSS) 34. Notably, the interrogating CSCF provides the standard I-CSCF functions and the serving CSCF provides the standard S-CSCF functions. These functions are represented in the I/S-CSCF 28 for conciseness. Call/session control functions (CSCFs) in the home MS 12 generally act as SIP proxies and provide various functions in association with call control, as will be appreciated by those skilled in the art.

In operation, an interrogating CSCF (I-CSCF) may interact with the HSS 34 to identify the serving CSCF (S-CSCF), which will be assigned to support a given user element. For the present invention, the HSS 34 may maintain an association between the user elements 16C and 16M and a particular CCF 30 that is assigned to the user elements 16C and 16M as part of a specific user's profile. As such, the HSS 34 will assist in identifying a serving CSCF for the user elements 16C and 16M, as well as keep an association between a particular CCF 30 and the user elements 16C and 16M. The CCF PSI for the user element 16C may be provisioned in the user element 16C to enable the user element 16C to initiate transfers and the like, which are controlled by the CCF 30. Alternatively, the CCF PSI may be transferred to the user element 16C upon network registration.

When the user elements 16C and 16M register in the home MS 12 directly or via the CS 14, the user elements 16C, 16M will have a S-CSCF assigned to them, and will use that S-CSCF to access the CCF 30. The application server 32 may be invoked and placed within the call signaling path to implement any number of features or services. When a particular application service provided by an application server 32 is invoked, most, if not all, signaling for the associated call or session is passed through the application server 32, which has the opportunity to process call signaling messages as necessary to implement the desired service. Notably, the CCF 30 may appear as an application service, and as such, the I/S-CSCF 28 will operate to pass call signaling messages for the call through the CCF 30, thereby allowing the CCF 30 to act as an anchor for the call. Notably, the application server 32 may be a service node as described in U.S. patent application Ser. No. 11/536,921 filed Sep. 29, 2006, which is incorporated herein by reference in its entirety, and may interwork with an enterprise server attached to the MS 12 via the service node to deliver enterprise services to a user element 16.

In FIG. 1A, the user element 16C is engaged in a call supported by the CS client 18 and controlled by the CCF 30. The user element 16M is not engaged in a call. Call signaling for the call of user element 16C passes through the VMSC 22, the media gateway controller 24, the I/S-CSCF 28, the CCF 30, and perhaps the application server 32, if a service is invoked, on its way toward a remote endpoint 36. Notably, the access signaling leg, which is provided by the CS 14, is anchored at the CCF 30 and extends through the I/S-CSCF 28, the media gateway controller 24, the VMSC 22, and the CS client 18 of the user element 16C. The remote signaling leg toward the remote endpoint 36 is anchored in the CCF 30 and extends through the I/S-CSCF 28 and the application server 32. In this configuration, the CCF 30 can maintain control of the call and provide any necessary call processing during the call. Further, if a transfer of the call to another user element is required, the CCF 30 maintains the remote signaling leg and establishes a new access signaling leg.

The bearer path for the call illustrated in FIG. 1A extends from the CS client 18 of user element 16C through the VMSC 22 and media gateway 26 on its way toward the remote endpoint 36. Notably, the media gateway controller 24 cooperates with the media gateway 26, such that a circuit-switched portion of the bearer path may be established between the media gateway 26 and the CS client 18 via the VMSC 22. The packet portion of the bearer path may be established for the call from the media gateway 26 through the home MS 12 toward the remote endpoint 36.

Figure 1B:
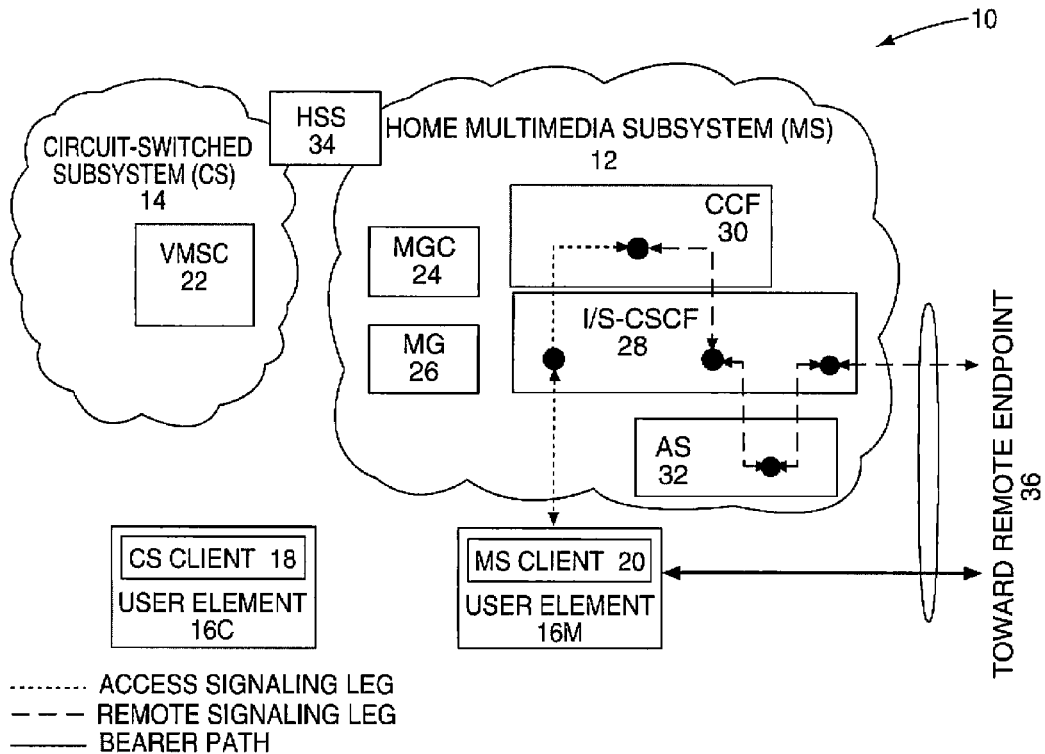
FIG. 1B is a communication environment illustrating multimedia subsystem access for a user element according to one embodiment of the present invention.

With reference to FIG. 1B, a call supported by the MS client 20 of the user element 16M is represented. The user element 16C is not engaged in a call. Notably, the call does not extend through the CS 14, and will not employ the services of the VMSC 22, the media gateway controller 24, or the media gateway 26. Instead, the MS client 20 of the user element 16M will support call signaling directly with the home MS 12, and in particular with the CCF 30 via the I/S-CSCF 28.

As illustrated, call signaling is anchored in the CCF 30, wherein an access signaling leg is provided between the CCF 30 and the MS client 20 via the I/S-CSCF 28. A remote signaling leg is supported between the remote endpoint 36 and the CCF 30 via the I/S-CSCF 28 and any desired application servers 32 that may provide additional services in association with the call. The bearer path will extend from the MS client 20 toward the remote endpoint 36 via the home MS 12, without traveling through the CS 14 (as in FIG. 1A). Again, the CCF 30 anchors the call, such that if a transfer of the call to another user element is required, the remote signaling leg toward the remote endpoint 36 can be maintained, while the access signaling leg may be changed to facilitate the transfer from the home MS 12 to the CS 14, as will be described further below. For call transfers between user elements 16C and 16M across the CS 14 and the home MS 12, the access signaling legs illustrated in FIGS. 1A and 1B will be changed to support the call transfer, while the remote signaling leg is maintained by the CCF 30.

Call transfers from one user element to another may be provided within a given domain or across domains. In either case, call transfers are executed and controlled in the home MS 12 by the CCF 30, upon a request received from the user element 16C or 16M. To enable such transfers, the CCF 30 is inserted into the signaling path of the calls by an S-CSCF 28. To anchor the signaling path, the CCF 30 may employ a back-to-back user agent function (B2BUA), which may operate as follows. When the user element 16C or 16M originates a call, the CCF 30 will terminate an access signaling leg from the user element 16C or 16M and establish a remote signaling leg toward the remote endpoint 36. When terminating a call at the user element 16C or 16M, the CCF 30 will terminate a remote signaling leg from the remote endpoint 36 and establish an access signaling leg toward the user element 16C or 16M. Subsequently, the CCF 30 will coordinate call signaling between the access signaling leg and the remote signaling leg for the call.

When the user element 16C or 16M is originating a call, the CCF 30 appears as a service provided by an application server, such as the application server 32. In one embodiment, the CCF 30 is invoked as the first service in a chain of services. When the user element 16C or 16M is terminating a call, the CCF 30 is invoked as the last service in a chain of services. By locating the CCF 30 with respect to the other services in this manner, other applications associated with the call are anchored by the CCF 30 as part of the remote signaling leg of the call, and are therefore not impacted by transfers affecting the access signaling leg.

Upon receiving instructions from a user to transfer the call from a first user element 16C or 16M to a second user element 16C or 16M, the second user element 16C or 16M, which is not engaged in the call, will initiate a call to the CCF 30 using the appropriate CS or MS based address for the CCF 30. As a result, a new access signaling leg is established for the second user element 16C or 16M. The CCF 30 is provisioned to recognize receipt of the call from the second user element 16C or 16M while the first user element 16C or 16M has an instruction to transfer the call to the second user element 16C or 16M. The CCF 30 may access a user profile stored in the HSS 34. The user profile may define the various scenarios that require a transfer, and how to execute the transfer for multiple user elements 16 associated with a given user. A transfer from the first user element 16C or 16M to the second user element 16C or 16M is effected in part by replacing the access signaling leg for the first user element 16C or 16M with the new access signaling leg for the second user element 16C or 16M. The CCF 30 will connect the new access signaling leg for the second user element 16C or 16M to the remote signaling leg to provide a complete signaling path for the call. The CCF 30 will then release the old access signaling leg for the first user element 16C or 16M. The switch of the old and new access signaling legs does not impact the remote signaling leg or the application services provided in the remote signaling leg. Through the new access signaling leg and the remote signaling leg, the appropriate bearer path may be established to the user element 16C or 16M via the appropriate CS client 18 or MS client 20.

For a call transfer from the first user element 16C or 16M in a "transferring-out" subsystem to the second user element 16C or 16M in a "transferring-in" subsystem, the respective access signaling legs and bearer paths are represented in FIGS. 1A and 1B. For a first example, assume that a call has been established from first user element 16C in the CS 14 to the remote endpoint 36 and that the call is anchored in the CCF 30. The access signaling leg, remote signaling leg, and bearer path for the call are illustrated in FIG. 1A. To initiate a call transfer from first user element 16C in the CS 14 (transferring-out subsystem) to second user element 16M in the home MS 12 (transferring-in subsystem), second user element 16M will initiate a call to the CCF 30 over the access signaling leg illustrated in FIG. 1B. The CCF 30 will detect a need to transfer the call to second user element 16M based on receiving the call from second user element 16M, and will effect a transfer of the call to second user element 16M by establishing a new bearer path between second user element 16M and the remote endpoint 36 using the new access signaling leg. The access signaling leg, remote signaling leg, and bearer path for the transferred call are represented in FIG. 1B. The access signaling leg and the bearer path change for the transfer, but the remote signaling leg remains the same.

For a second example, assume that a call has been established from first user element 16M in the home MS 12 to the remote endpoint 36 and that the call is anchored in the CCF 30. The access signaling leg, remote signaling leg, and bearer path for the call are illustrated in FIG. 1B. To initiate a call transfer from first user element 16M in the home MS 12 (transferring-out subsystem) to second user element 16C in the CS 14 (transferring-in subsystem), second user element 16C will initiate a call to the CCF 30 over the access signaling leg illustrated in FIG. 1A. The CCF 30 will detect a need to transfer the call to second user element 16C based on receiving the call from second user element 16C, and will effect a transfer of the call to second user element 16C by establishing a new bearer path between second user element 16C and the remote endpoint 36 using the new access signaling leg. The access signaling leg, remote signaling leg, and bearer path for the transferred call are represented in FIG. 1A. The access signaling leg and the bearer path change for the transfer, but the remote signaling leg remains the same.

Figure 2A:
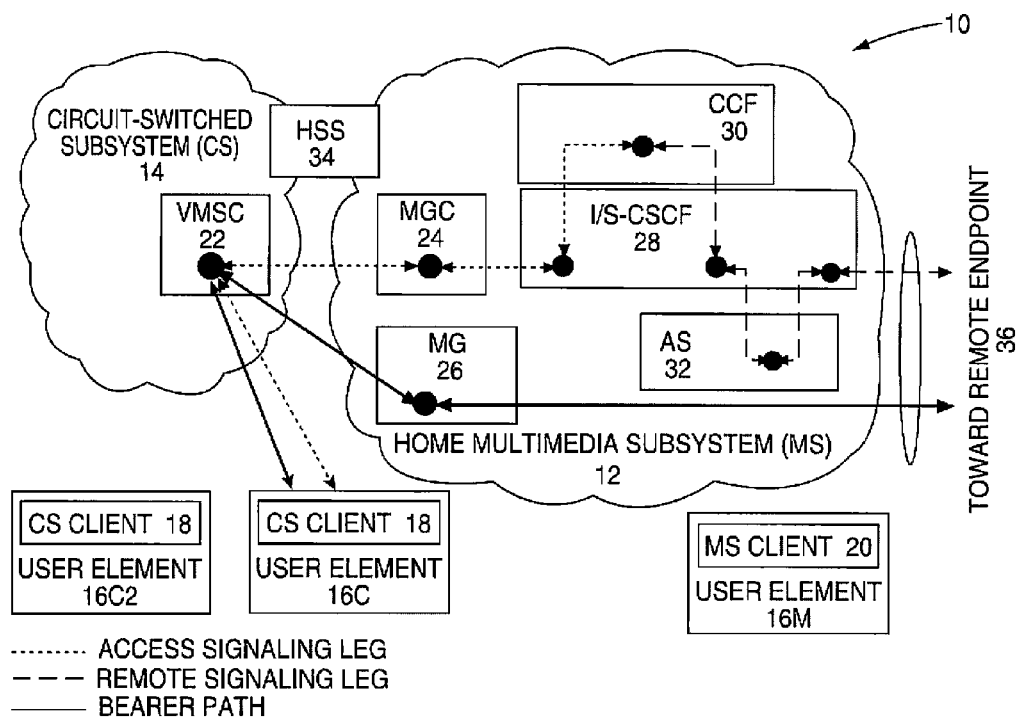
FIG. 2A is a communication environment illustrating circuit-switched subsystem access for a first user element according to one embodiment of the present invention.
Figure 2B:
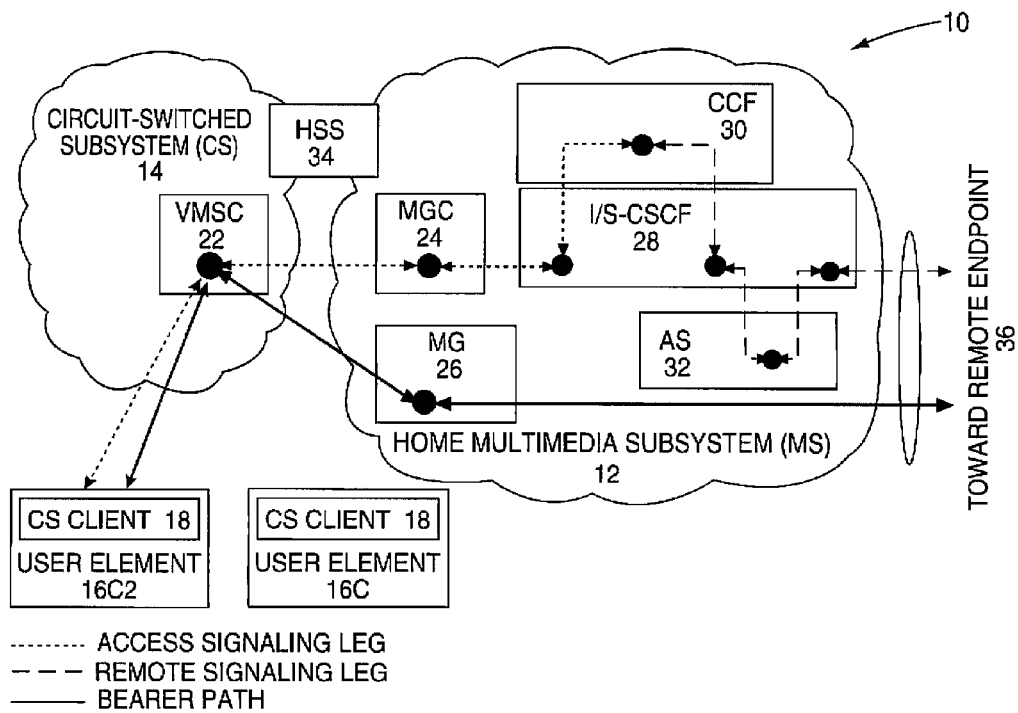
FIG. 2B is a communication environment illustrating circuit-switched subsystem access for a second user element according to one embodiment of the present invention.

For call transfers between user element 16C and user element 16C2, which are both supported by the CS 14 and associated with a given user, the respective access signaling legs and bearer paths are represented in FIGS. 2A and 2B. For a third example, assume that a call has been established from first user element 16C in the CS 14 to the remote endpoint 36 and that the call is anchored in the CCF 30. The access signaling leg, remote signaling leg, and bearer path for the call are illustrated in FIG. 2A. To initiate a call transfer from first user element 16C in the CS 14 to second user element 16C2, which is also in the CS 14, second user element 16C2 will initiate a call to the CCF 30 over the access signaling leg illustrated in FIG. 2B. The CCF 30 will detect a need to transfer the call to second user element 16C2 based on receiving the call from second user element 16C2, and will effect a transfer of the call to user element 16C2 by establishing a new bearer path between second user element 16C2 and the remote endpoint 36 using the new access signaling leg. The access signaling leg, remote signaling leg, and bearer path for the transferred call are represented in FIG. 2B. The access signaling leg and the bearer path change for the transfer, but the remote signaling leg remains the same.

For a fourth example, assume that a call has been established from first user element 16C2 in the CS 14 to the remote endpoint 36 and that the call is anchored in the CCF 30. The access signaling leg, remote signaling leg, and bearer path for the call are illustrated in FIG. 2B. To initiate a call transfer from first user element 16C2 in the CS 14 to second user element 16C, which is also in the CS 14, second user element 16C will initiate a call to the CCF 30 over the access signaling leg illustrated in FIG. 2A. The CCF 30 will detect a need to transfer the call to second user element 16C based on receiving the call from second user element 16C, and will effect a transfer of the call to second user element 16C by establishing a new bearer path between second user element 16C and the remote endpoint 36 using the new access signaling leg. The access signaling leg, remote signaling leg, and bearer path for the transferred call are represented in FIG. 2A. The access signaling leg and the bearer path change for the transfer, but the remote signaling leg remains the same.

Figure 3A:
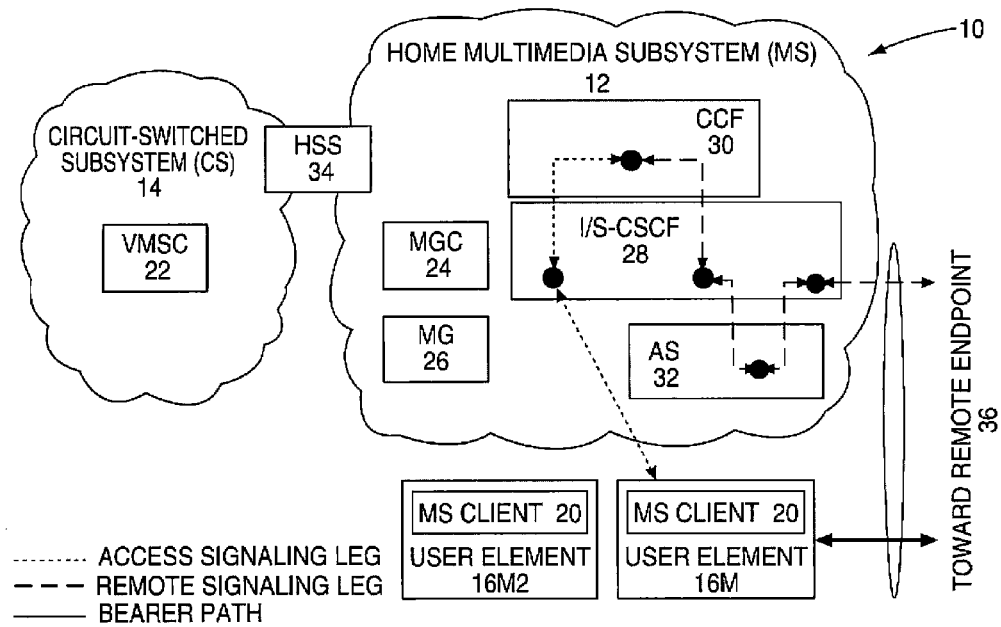
FIG. 3A is a communication environment illustrating multimedia subsystem access for a first user element according to one embodiment of the present invention.
Figure 3B:
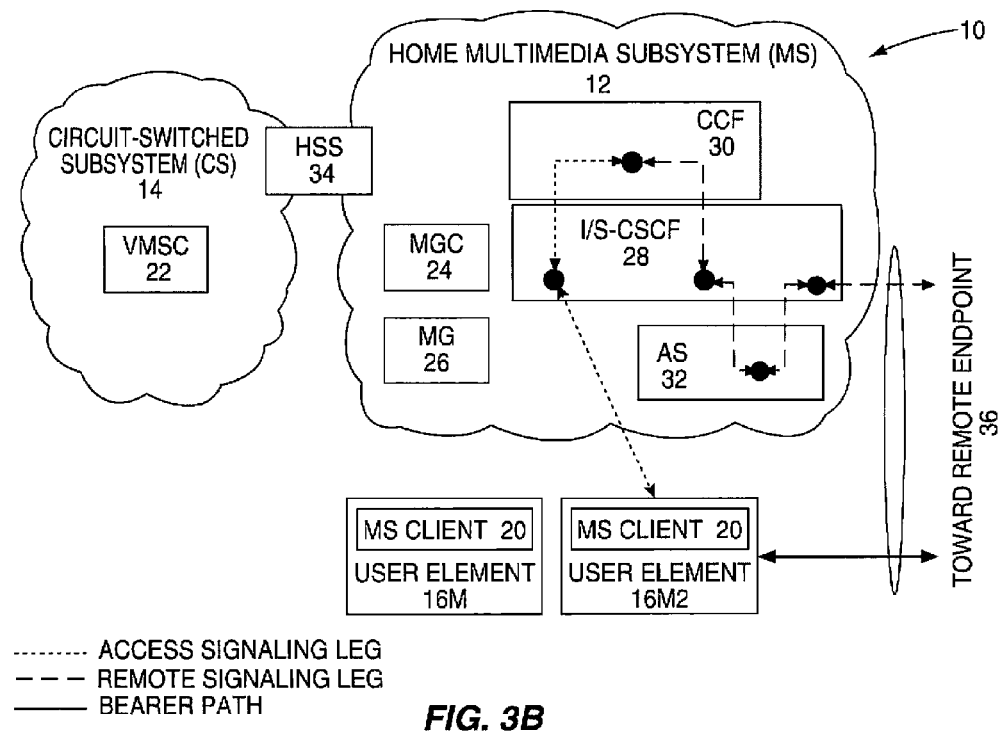
FIG. 3B is a communication environment illustrating multimedia subsystem access for a second user element according to one embodiment of the present invention.

For call transfers between user element 16M and user element 16M2, which are both supported by the home MS 12 and associated with a given user, the respective access signaling legs and bearer paths are represented in FIGS. 3A and 3B. For a fifth example, assume that a call has been established from first user element 16M in the MS 12 to the remote endpoint 36 and that the call is anchored in the CCF 30. The access signaling leg, remote signaling leg, and bearer path for the call are illustrated in FIG. 3A. To initiate a call transfer from first user element 16M in the MS 12 to second user element 16M2, which is also in the MS 12, second user element 16M2 will initiate a call to the CCF 30 over the access signaling leg illustrated in FIG. 3B. The CCF 30 will detect a need to transfer the call to second user element 16M2 based on receiving the call from second user element 16M2, and will effect a transfer of the call to second user element 16M2 by establishing a new bearer path between second user element 16M2 and the remote endpoint 36 using the new access signaling leg. The access signaling leg, remote signaling leg, and bearer path for the transferred call are represented in FIG. 3B. The access signaling leg and the bearer path change for the transfer, but the remote signaling leg remains the same.

For a sixth example, assume that a call has been established from first user element 16M2 in the home MS 12 to the remote endpoint 36 and that the call is anchored in the CCF 30. The access signaling leg, remote signaling leg, and bearer path for the call are illustrated in FIG. 3B. To initiate a call transfer from first user element 16M2 in the home MS 12 to second user element 16M, which is also in the home MS 12, second user element 16M will initiate a call to the CCF 30 over the access signaling leg illustrated in FIG. 3A. The CCF 30 will detect a need to transfer the call to second user element 16M based on receiving the call from second user element 16M, and will effect a transfer of the call to second user element 16M by establishing a new bearer path between second user element 16M and the remote endpoint 36 using the new access signaling leg. The access signaling leg, remote signaling leg, and bearer path for the transferred call are represented in FIG. 3A. The access signaling leg and the bearer path change for the transfer, but the remote signaling leg remains the same.

Based on the above, those skilled in the art will recognize that calls for user elements 16 supported in any type of subsystem, including the home MS 12, may be anchored in the home MS 12. These calls may be transferred to other user elements that are associated with a user or group using concepts of the present invention. The invention is not limited to the home MS 12 and the CS 14.

In one embodiment of the present invention, the mobile subscriber integrated services digital network (MSISDN) number or other user element identifier is owned and controlled by the home MS 12 to enable anchoring of incoming calls intended for the user element 16C or 16M at the CCF 30. Incoming calls destined for the user element 16C or 16M and originated from the CS 14, the PSTN, or other CS or MS can be anchored at the CCF 30 by setting up routing functions at the originating service nodes, such that incoming calls intended for the user element 16C or 16M are delivered to the home MS 12. As such, the CCF 30 can take the necessary steps to find the user element 16C or 16M and route the call to the user element 16C or 16M, even if the user element 16 is in the CS 14 or other subsystem when the call arrives.

The HSS 34 may store filter criteria associated with the CCF 30 as part of the user's or user element's subscription profile. The CCF filter criteria is downloaded to the currently assigned S-CSCF (28 or 40) as part of the initial filter criteria to use when the user element 16C or 16M registers with the home MS 12. This filter criteria is generally executed at the I/S-CSCF 28 upon initiation of a call (or session) from the user element 16C or 16M or upon receipt of an incoming session intended for the user element 16C or 16M. This filter criteria will instruct the I/S-CSCF 28 to invoke the CCF 30 to control at least the bearer path for the call. The user element's subscription profile will also identify the associated user element 16C or 16M to or from which calls may be transferred. The CCF 30 will access the subscription profile to determine whether to initiate a call transfer upon receiving a call initiated from a user element 16C or 16M.

As described above, a second user element 16C2 or 16M2 may request a transfer of a call with a first user element 16C or 16M by initiating a call to a CCF 30 at which the call is anchored. When a call is not being supported by the first user element 16C or 16M, the second user element 16C2 or 16M2 may initiate calls to the CCF 30 to provide instructions for the CCF 30 or updates for an associated subscription profile that is maintained in the HSS 34. The instructions provided by the second user element 16C2 or 16M2 may provide call forwarding instructions for subsequent calls intended for the user or any of the user elements 16C, 16C2, 16M, 16M2, associated with the user. The CCF 30 will use the call forwarding instructions to route or reroute incoming calls intended for the user to one or more of the user elements 16C, 16C2, 16M, 16M2 at the same or different times. The call forwarding instructions may also dictate the routing of incoming calls to other terminals that are not associated with the user, or to a voicemail system.

The following provides a few call forwarding examples. In a first embodiment, the call forwarding instructions may result in the CCF 30 forwarding only the next incoming call or next N incoming calls intended for any of the user elements 16C, 16C2, 16M, or 16M2 to user element 16C. All subsequent calls intended for the user will be routed in normal fashion. In a second embodiment, the call forwarding instructions may result in the CCF forwarding any incoming calls received within a certain time period and intended for any of the user elements 16C, 16C2, 16M, or 16M2 to user element 16M. Incoming calls intended for the user and received after the time period will be routed in a normal fashion. In a third embodiment, the call forwarding instructions may result in the CCF 30 forwarding all incoming calls intended for any of the user elements 16C, 16C2, 16M, or 16M2 to user element 16M until instructed otherwise.

The following communication flows are high level, and provide illustrative examples of originating, terminating, and transferring calls between user element 16C and 16M. The examples are not intended to limit the scope of the invention and are provided merely to further clarify the various concepts of the present invention. For originating calls, calls from user element 16C may be brought into the MS 12 as defined in the Third Generation Partnership Project's (3GPP) TS 23.206, which is incorporated herein by reference.

Figure 4A:
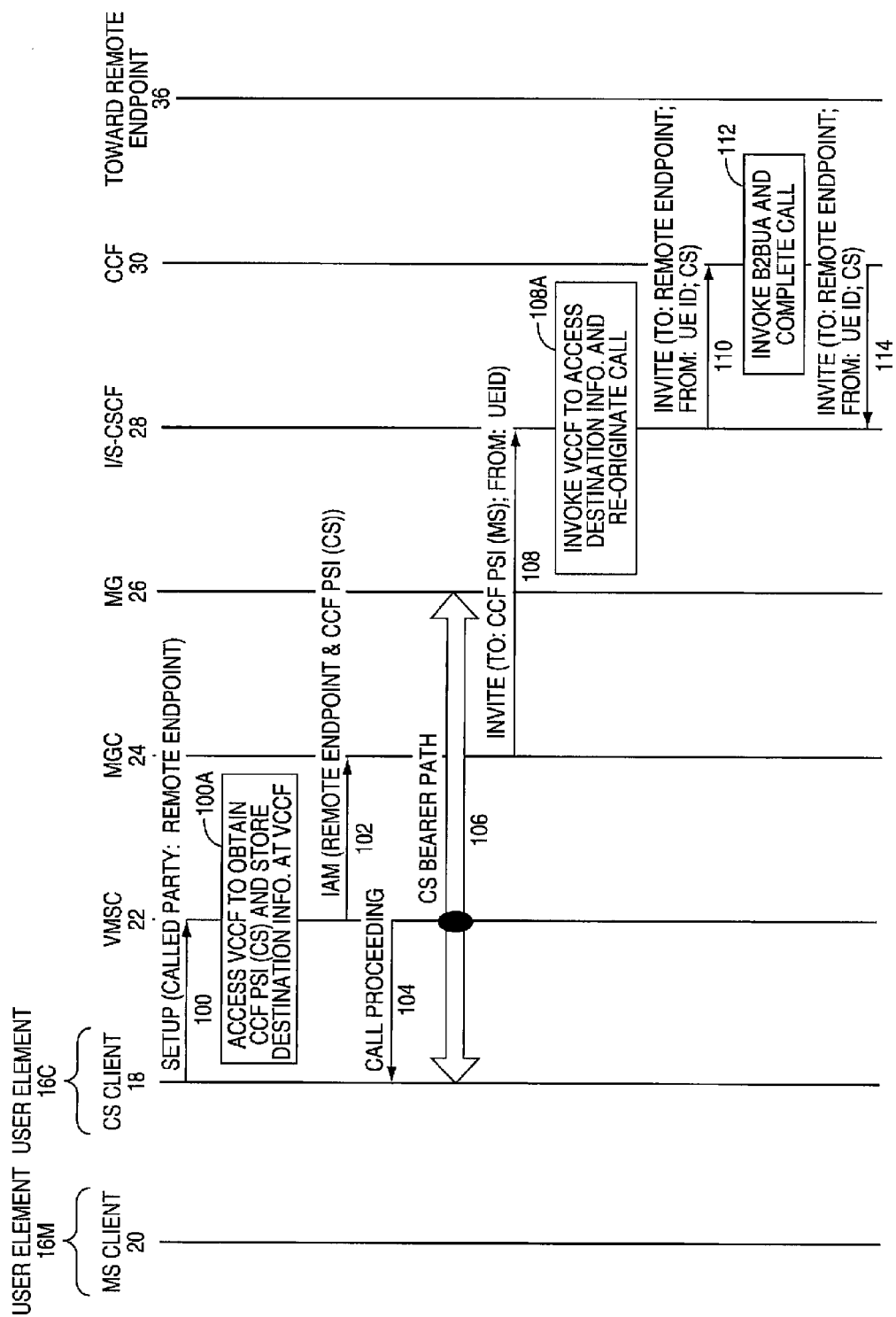
FIGS. 4A and 4B show a communication flow illustrating originating a call via the circuit-switched subsystem according to one embodiment of the present invention.
Figure 4B:
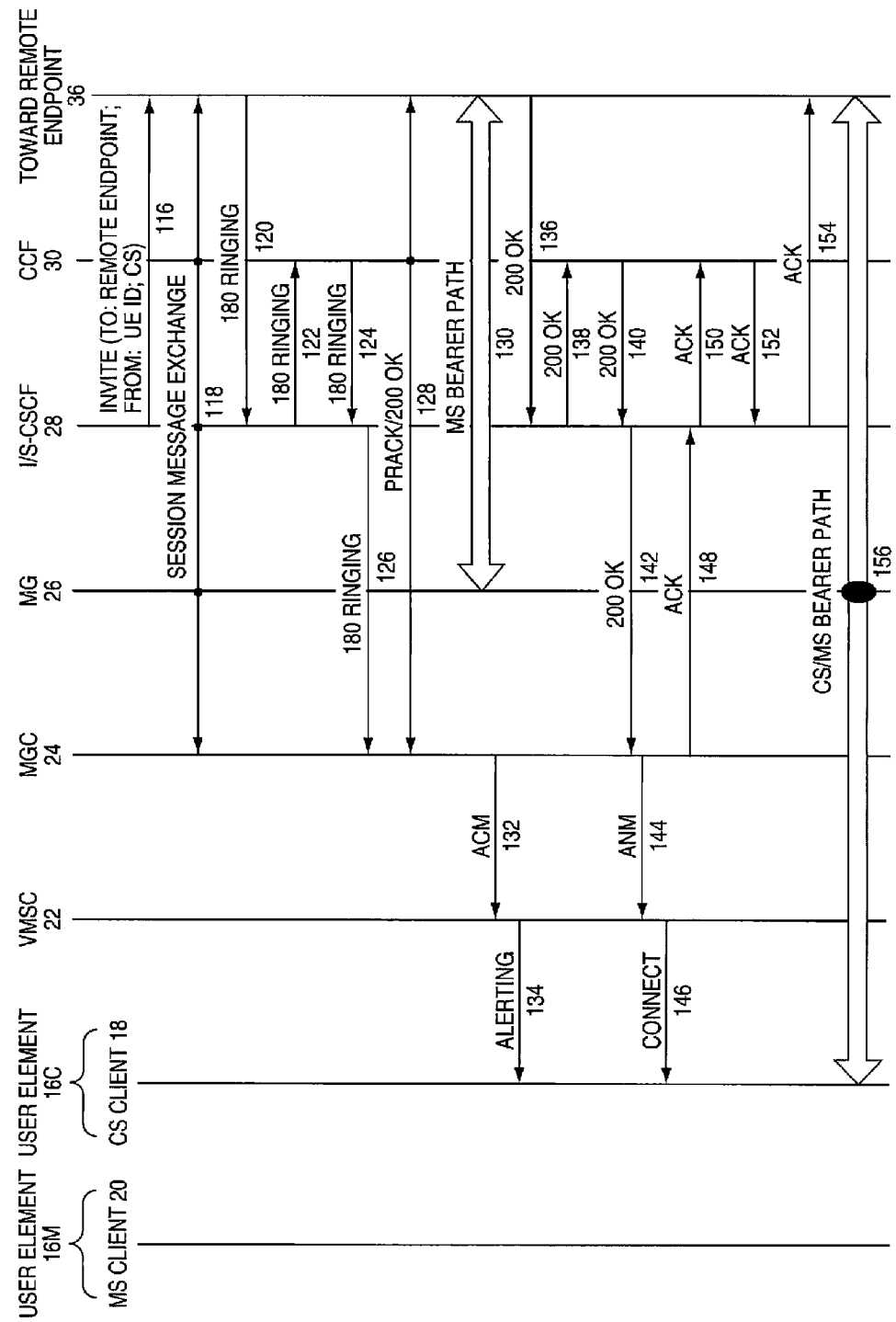

With reference to FIGS. 4A and 4B, a communication flow is provided to illustrate the origination of a call from the CS client 18 of the user element 16C via the CS 14 to the remote endpoint 36. The CS client 18 of the user element 16C will send a call setup message to its supporting VMSC 22 (step 100). The call setup message will identify the directory number of the remote endpoint 36. In response, the VMSC 22 will access a voice continuity control function (VCCF) in the MS 12 to obtain a CCF PSI (CS) for the CCF 30 (step 100A). The VMSC 22 will then send an Integrated Services User Part (ISUP) Initial Address Message (IAM) to the media gateway controller 24 addressing a routing number that identifies the remote endpoint 36, as well as including the CS PSI for the CCF 30 (step 102). The VMSC 22 will also provide a Call Proceeding message back to the CS client 18 of the user element 16C (step 104). This exchange results in a CS bearer leg being established from the CS client 18 to the media gateway 26 via the VMSC 22 (step 106). The media gateway controller 24 will act on behalf of the user element 16C.

Upon receiving the IAM from the VMSC 22, the media gateway controller 24 will send an Invite to the I/S-CSCF 28 to initiate establishment of an MS bearer leg toward the remote endpoint 36 for which the call is intended from the media gateway 26 (step 108). When generating the Invite, the media gateway controller 24 will identify the MS-based PSI for the CCF 30 in light of the CS-based PSI received in the IAM. The I/S-CSCF 28 will invoke the VCCF to access the previously stored destination information for the call, and will re-originate the call from within the MS 12 (step 108A). The MS-based PSI for the CCF 30 is the address to which the Invite is sent.

The I/S-CSCF 28 will recognize the need to invoke the CCF 30 for the call, and will send the Invite to the CCF 30 (step 110), which may invoke a back-to-back user agent (B2BUA) and then take the necessary steps to complete the call (step 112). The Invite may identify the user element 16C as the originator of the call and identify the remote endpoint 36 as the destination for the call, based on information retrieved from the user. The Invite may also indicate that the call was originated through the CS 14. As such, the CCF 30 will send an Invite back to the I/S-CSCF 28 to complete the call (step 114). The Invite will now include the address of the remote endpoint 36 or a supporting node with which a packet session can be established. The Invite will identify the media gateway controller 24 of the media gateway 26 as the other endpoint for the packet session that will support the call. The I/S-CSCF 28 will then send the Invite toward the remote endpoint 36 (step 116). At this point, the traditional session message exchange between the remote endpoint 36 and the media gateway controller 24 will take place through the CCF 30 and the I/S-CSCF 28 to prepare the respective remote endpoint 36 and media gateway 26 to support the MS bearer leg (step 118).

In the meantime, the I/S-CSCF 28 may receive various signaling messages back from the remote endpoint 36, such as a 180 Ringing message (step 120). The 180 Ringing message indicates that the call is being presented to the remote endpoint 36. The I/S-CSCF 28 will route all signaling messages through the CCF 30, and as such, the 180 Ringing message is sent to the CCF 30 (step 122), which will forward the message back to the I/S-CSCF 28 (step 124). The I/S-CSCF 28 will send the 180 Ringing message to the media gateway controller 24 (step 126). After a Provisional Acknowledgement (PRACK) and 200 OK message exchange between the media gateway controller 24 and the remote endpoint 36 through the CCF 30 (step 128), the MS bearer path is effectively established (step 130), which means that the media gateway 26 and the remote endpoint 36 can send packets back and forth in association with the call.

The media gateway controller 24 will send an Address Complete Message (ACM) to the VMSC 22 (step 132), which will send an Alerting message to the user element 16C to indicate that call is being presented to the remote endpoint 36 (step 134). When the call is answered by the remote endpoint 36, the I/S-CSCF 28 will receive a 200 OK message (step 136) and route the 200 OK message to the CCF 30 (step 138). The CCF 30 will process the message if necessary, and then send the message back to the I/S-CSCF 28 (step 140), which will forward the 200 OK message to the media gateway controller 24 (step 142). The media gateway controller 24 will send an Answer Message (ANM) to the VMSC 22 (step 144), which will send a Connect message to the CS client 18 (step 146) to indicate that the call has been answered. To complete the call, the media gateway controller 24 will provide appropriate signaling to the media gateway 26, as well as send an acknowledgement (ACK) message back to the I/S-CSCF 28 (step 148). The I/S-CSCF 28 will again forward the ACK to the CCF 30 (step 150), which will forward the message back to the I/S-CSCF 28 (step 152). The I/S-CSCF 28 will then send the ACK toward the remote endpoint 36 (step 154).

At this point, a CS/MS bearer path is established between the CS client 18 of the user element 16C and the remote endpoint 36 via the media gateway 26 (step 156). Further, the call signaling associated with the call will be routed through the CCF 30. Notably, the back-to-back user agent invoked by the CCF 30 is the function that represents an endpoint for signaling associated with the remote signaling leg as well as an endpoint for the access signaling leg. The back-to-back user agent will provide any necessary processing or filtering and then relay messages over the respective access and remote signaling legs.

Figure 5A:
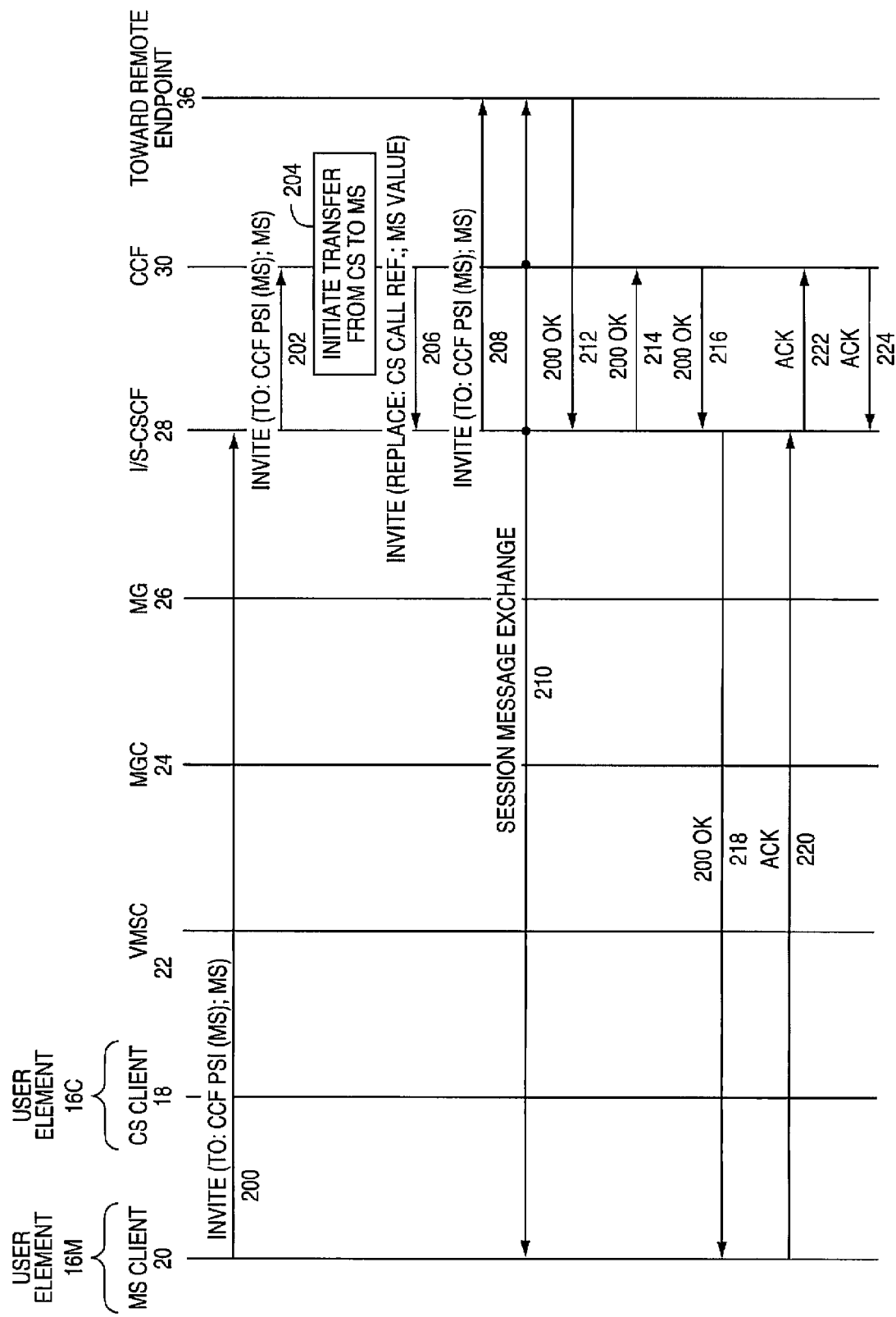
FIGS. 5A and 5B show a communication flow illustrating the transfer of the call established in FIGS. 4A and 4B to the multimedia subsystem according to one embodiment of the present invention.
Figure 5B:
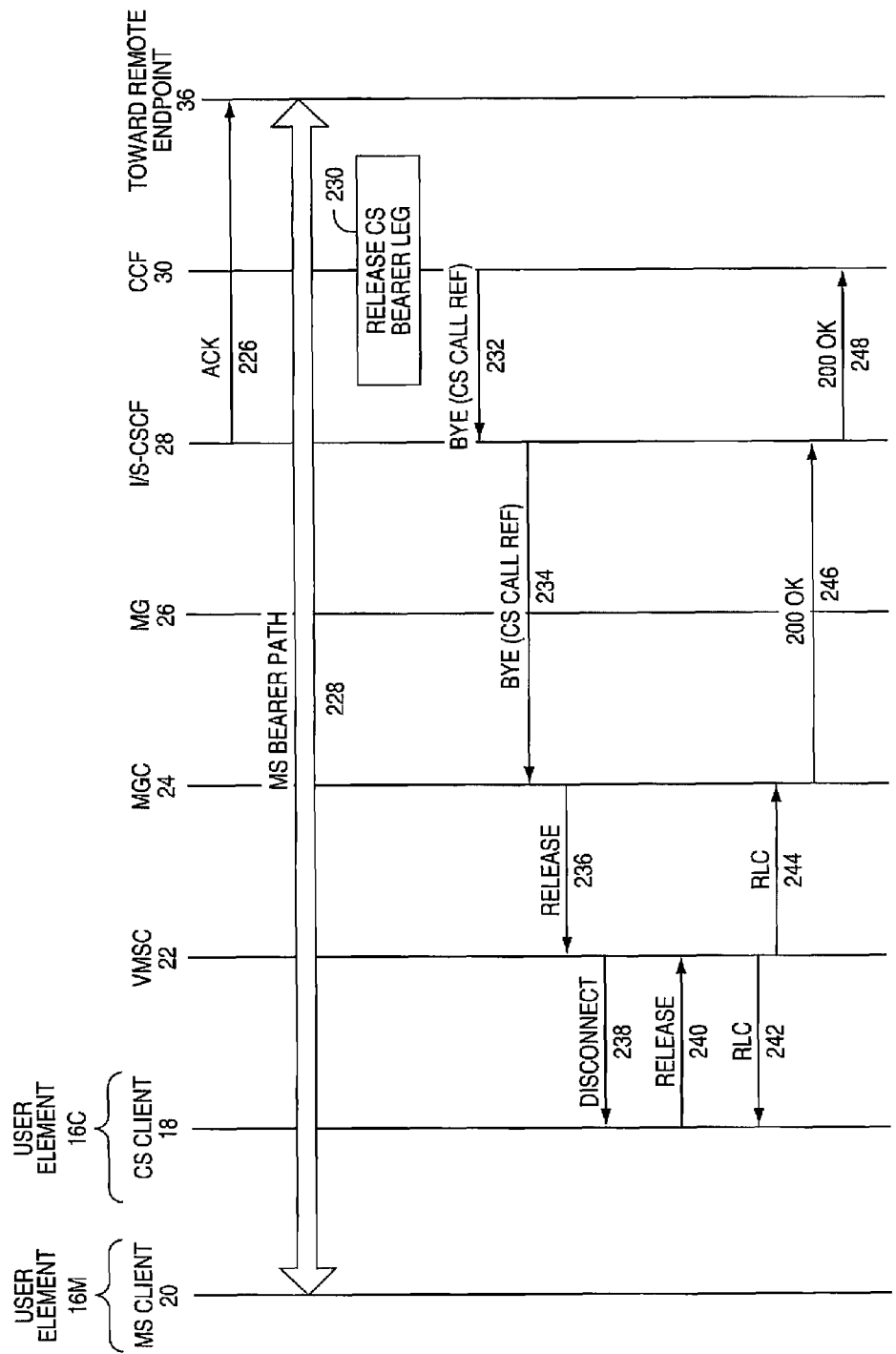

With reference to FIGS. 5A and 5B, a communication flow is illustrated wherein the call established in FIGS. 4A and 4B is transferred from user element 16C of the CS 14 to user element 16M of the home MS 12. As such, the new access signaling leg is established between the MS client 20 of the user element 16M and the CCF 30 through the I/S-CSCF 28. Further, the bearer path will no longer be routed through the media gateway 26 to the CS client 18 of user element 16C, but instead will be routed from the MS client 20 of user element 16M through the home MS 12 toward the remote endpoint 36.

Initially, user element 16M will recognize that there is a need for a transfer of the call from user element 16C in the CS 14 to user element 16M in the home MS 12, perhaps by receiving instructions from the user to initiate the transfer. The MS client 20 of the user element 16M may then register with the home MS 12 if necessary (not shown), and send an Invite toward the CCF 30 using the MS PSI for the CCF 30. Initiation of the call is effectively a request for a transfer of the call to user element 16M in the home MS 12 from user element 16C in the CS 14. The Invite will be received by the I/S-CSCF 28 (step 200), which will forward the Invite to the CCF 30 upon running the appropriate filter criteria (step 202). The CCF 30 will process the Invite and access the subscription profile associated with user element 16M. The subscription profile will indicate that a call initiated from user element 16M to the CCF 30 when user element 16C is engaged in a call is a request to transfer the call from user element 16C to user element 16M. The CCF 30 will recognize that user element 16C is engaged in a call and will initiate a transfer of the call from user element 16C in the CS 14 to user element 16M in the home MS 12 (step 204). The CCF 30 will then send an Invite toward the remote endpoint 36. The Invite will be received by the I/S-CSCF 28 (step 206), which will then forward the Invite toward the remote endpoint 36 (step 208). The Invite will include a reference number for the existing call (CS CALL REF) and provide instructions for the remote endpoint 36 to establish a new bearer path for the call directly with the MS client 20 instead of with the media gateway 26.

At this point, the MS client 20 of the user element 16M and the remote endpoint 36 will exchange the requisite session messages to enable an MS bearer path therebetween (step 210). These session messages will be sent through the I/S-CSCF 28 and the CCF 30. When the remote endpoint 36 is ready to make the transition, the I/S-CSCF 28 will receive a 200 OK message from the remote endpoint 36 (step 212). The I/S-CSCF 28 will send a 200 OK message to the CCF 30 (step 214), which will send a 200 OK message back to the I/S-CSCF 28 (step 216), which will forward the 200 OK message to the MS client 20 of the user element 16M (step 218). The MS client 20 will send an acknowledgement message back to the I/S-CSCF 28 (step 220), which will send the acknowledgement message to the CCF 30 (step 222). The CCF 30 will send the acknowledgement message back to the I/S-CSCF 28 (step 224), which will send the acknowledgement message toward the remote endpoint 36 (step 226).

At this point, the remote endpoint 36 and the MS client 20 of the user element 16M are ready to support communications over an MS bearer path established therebetween (step 228). The bearer and signaling paths to user element 16C through the CS 14 must then be torn down (step 230). Accordingly, the CCF 30 will send a Bye message identifying the reference number for the CS-based call to the I/S-CSCF 28 (step 232), which will send a Bye message to the media gateway controller 24 (step 234). The media gateway controller 24 will send a Release message to the VMSC 22 (step 236), which will send a Disconnect message to the CS client 18 of the user element 16C (step 238). The CS client 18 of user element 16C will respond by sending a Release message to the VMSC 22 to indicate that the Disconnect message was received (step 240). The VMSC 22 will then send a Release Complete message (RLC) back to the CS client 18 to end the circuit-switched connection (step 242). The VMSC 22 will also send a Release Complete message to the media gateway controller 24 (step 244). At this point, the circuit-switched connection between user element 16C and the media gateway 26 no longer exists. The media gateway controller 24 will send a 200 OK message to the I/S-CSCF 28 to indicate that the circuit-switched portion of the call has ended (step 246). The I/S-CSCF 28 will then send the 200 OK message to the CCF 30 to indicate the status of the circuit-switched portion of the call (step 248).

At this point, the CS-based access signaling leg is released in favor of the MS-based access signaling leg. Notably, the remote signaling leg between the CCF 30 and the remote endpoint 36 remains intact. The information carried in the Invite message may be provided in the Session Description Protocol (SDP) fields of the Invite message. However, those skilled in the art will recognize that other messages, such as Refer and Update messages, and other protocols may also be used to implement session transfer.

Figure 6A:
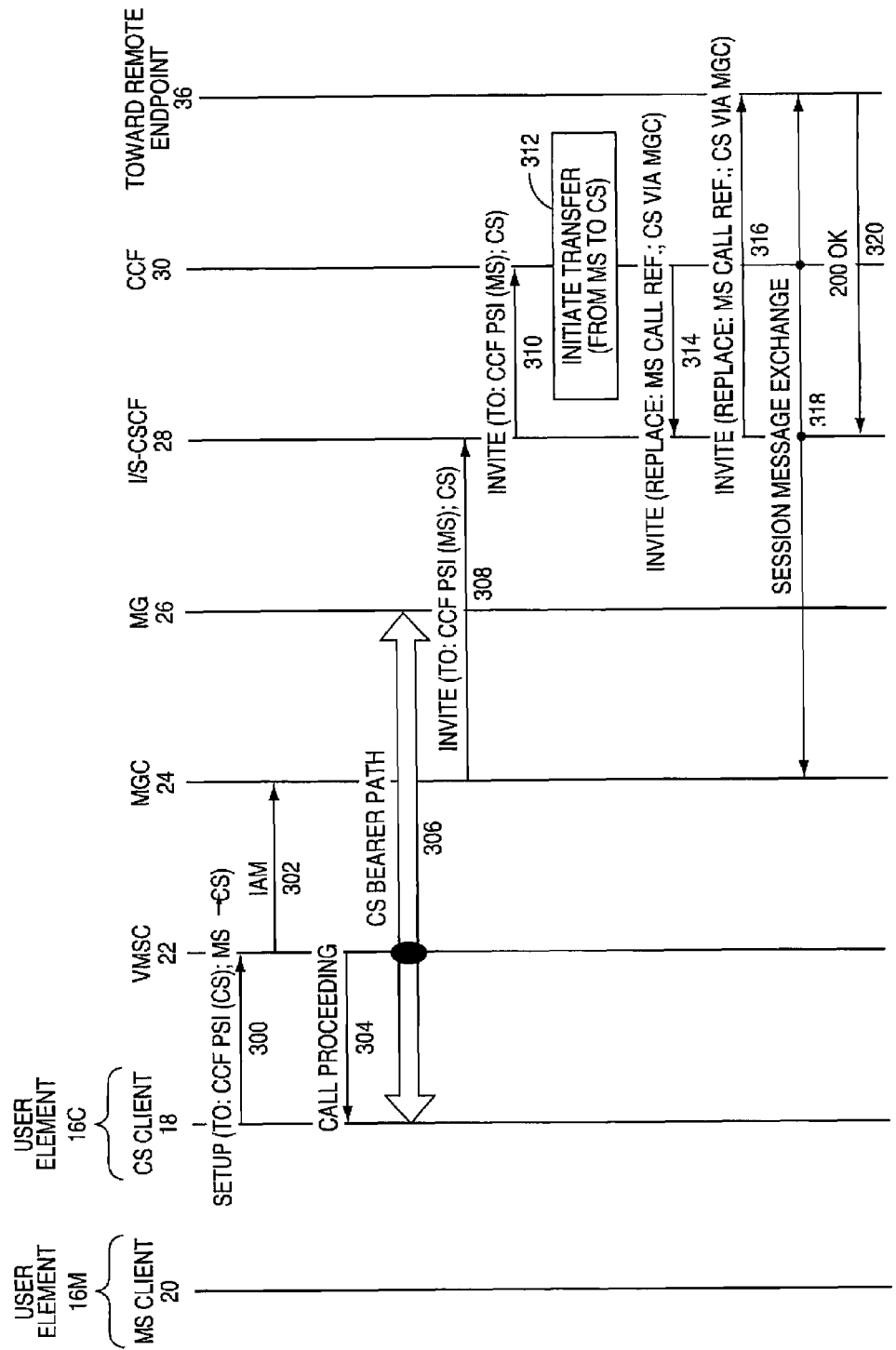
FIGS. 6A and 6B show a communication flow illustrating the transfer of the call of FIGS. 5A and 5B back to the circuit-switched subsystem according to one embodiment of the present invention.
Figure 6B:
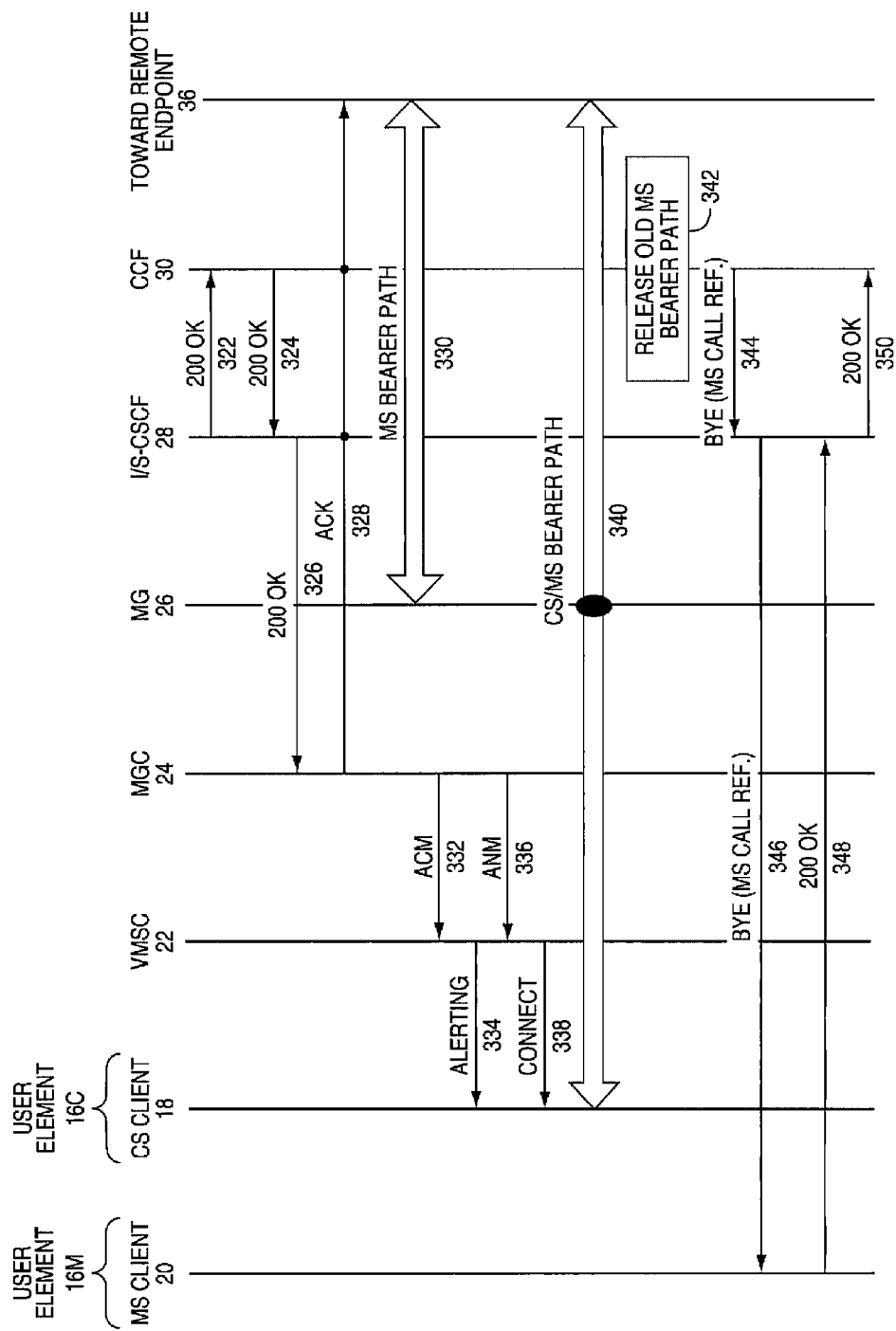

With reference to FIGS. 6A and 6B, a communication flow is provided wherein the MS-based call with user element 16M as provided in FIGS. 5A and 5B is transferred back to user element 16C in the CS 14. In response to instructions from the user, user element 16C in the CS 14 determines that there is a need for a transfer from user element 16M in the home MS 12 to user element 16C in the CS 14. User element 16C will register with the VMSC 22, if necessary (not shown). User element 16C will subsequently initiate a call to the CCF 30 through the CS 14 using the CS PSI associated with the CCF 30 to request a transfer from user element 16M in the home MS 12 to user element 16C in the CS 14. Accordingly, a Setup message may be sent from the CS client 18 of user element 16C to the VMSC 22 (step 300). The VMSC 22 will route the call to the CCF 30 via the media gateway controller 24, and as such will send an IAM to the media gateway controller 24 (step 302). The VMSC 22 will send a Call Proceeding message back to the CS client 18 of user element 16C to indicate that the call is proceeding (step 304). At this time, the media gateway controller 24 will cooperate with the media gateway 26 to establish a CS bearer path with the CS client 18 of the user element 16C via the VMSC 22 (step 306). The media gateway controller 24 will create an Invite message intended for the CCF 30 that indicates that the call should be transferred from user element 16M in the home MS 12 to user element 16C in the CS 14. The destination of the Invite will use the MS PSI associated with the CCF 30. The Invite will be sent to the I/S-CSCF 28 (step 308), which will send the Invite to the CCF 30 upon running the appropriate filter criteria (step 310).

The CCF 30 will then initiate the transfer from the home MS 12 to the CS 14 (step 312) and send an Invite back to the I/S-CSCF 28 (step 314). The Invite will include a reference for the MS call (MS CALL REF) and an indication that a CS call is going to be established via the media gateway controller 24. The Invite is then sent by the I/S-CSCF 28 toward the remote endpoint 36 (step 316). The requisite session message exchange is then provided between the media gateway controller 24 and the remote endpoint 36 via the I/S-CSCF 28 and the CCF 30 (step 318). After the session message exchange, the I/S-CSCF 28 will receive a 200 OK message from the remote endpoint 36 to indicate that the transfer is ready to take place (step 320). The I/S-CSCF 28 will route the 200 OK message to the CCF 30 (step 322), which will send the 200 OK message back to the I/S-CSCF 28 (step 324). The I/S-CSCF 28 will then send a 200 OK message to the media gateway controller 24 (step 326). The media gateway controller 24 will acknowledge receipt of the 200 OK message by forwarding an acknowledgement message toward the remote endpoint 36 via the IS-CSCF 28 and the CCF 30 (step 328). At this point, an MS bearer path is established between the media gateway 26 and the remote endpoint 36 (step 330).

The media gateway controller 24 will then send an Address Complete Message (ACM) to the VMSC 22 to indicate that the MS bearer path for the transfer is in place (step 332). The VMSC 22 will provide an Alerting message to the CS client 18 of user element 16C indicating the same (step 334). When the media gateway controller 24 is ready for the transfer, an Answer message (ANM) is sent to the VMSC 22 (step 336), which will send a Connect message to the CS client 18 of the user element 16C (step 338). At this point, a CS/MS bearer path is established between the CS client 18 of the user element 16C and the remote endpoint 36 via the media gateway 26 (step 340). The call is then transferred back into the CS 14 to user element 16C and supported entirely over the CS/MS bearer path. Again, call control remains anchored at the CCF 30, wherein signaling messages for the call are passed through the CCF 30.

To release the old MS bearer path to user element 16M (step 342), the CCF 30 will send a Bye message to the I/S-CSCF 28 (step 344). The Bye message will include a reference for the old MS call (MS CALL REF). The I/S-CSCF 28 will send the Bye message to the MS client 20 of the user element 16M (step 346), which will reply with a 200 OK message (step 348). The I/S-CSCF 28 will forward the 200 OK message to the CCF 30 (step 350). At this point, the old MS bearer path no longer exists. For transfers between user element 16C in the CS 14 and user element 16M in the home MS 12, the CCF 30 remains the anchor point for the call, and for any signaling legs necessary for supporting the call with the remote endpoint 36 or with either of user elements 16C and 16M. After the transfer, the CCF 30 will release any unnecessary signaling legs and bearer paths or legs. A similar process is employed when transferring calls between user elements 16C and 16C2 in the CS 14 or between user elements 16M and 16M2 in the home MS 12.

Figure 7A:
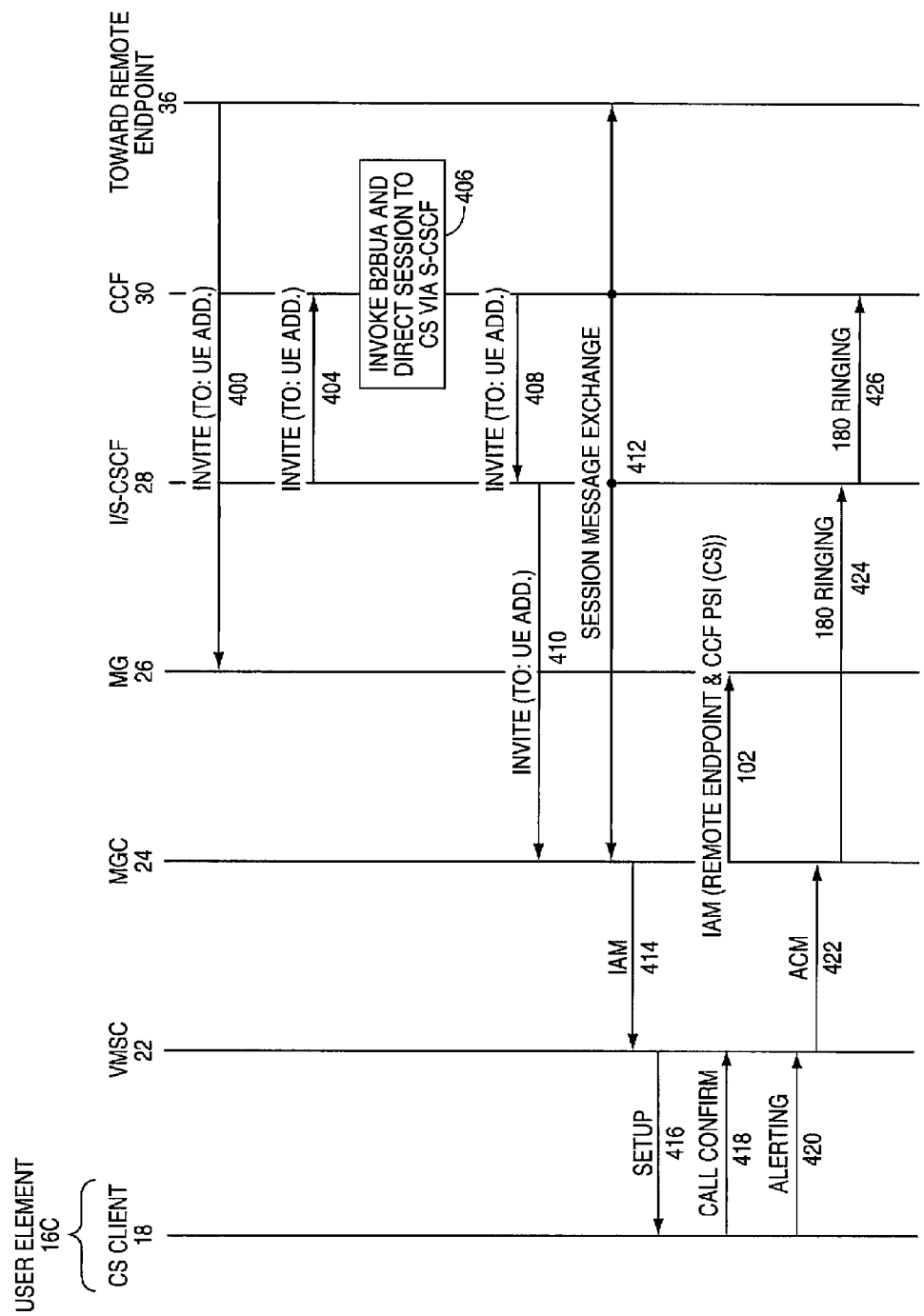
FIGS. 7A and 7B show a communication flow illustrating terminating an incoming call via the circuit-switched subsystem according to one embodiment of the present invention.
Figure 7B:
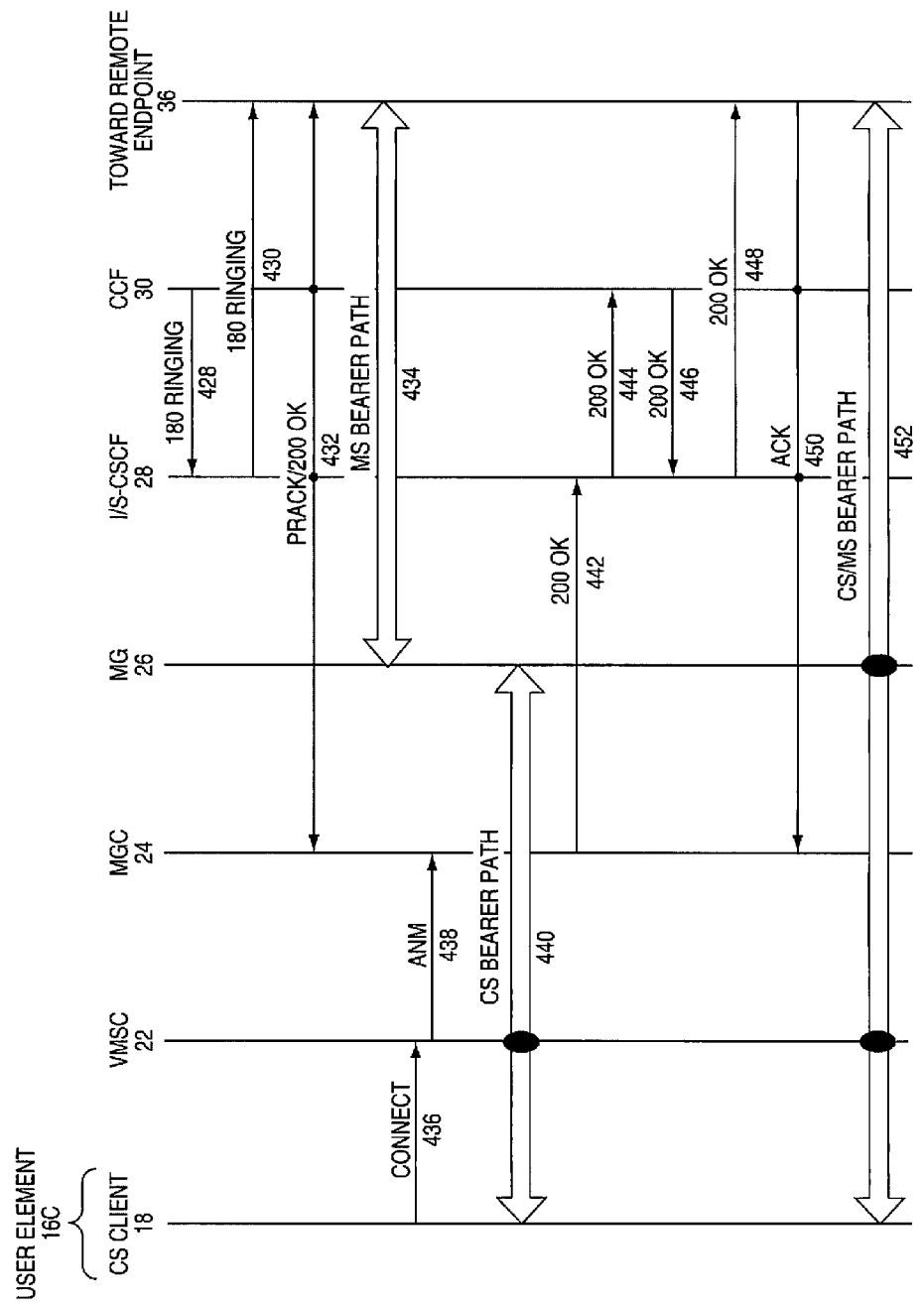

With reference to FIGS. 7A and 7B, a communication flow for terminating a call to user element 16C in the CS 14 and anchoring the call in the CCF 30 is provided. In this example, assume the call is initiated from a remote endpoint 36 in the home MS 12. As such, an Invite from the remote endpoint 36 is delivered to the I/S-CSCF 28 in the home MS 12 (step 400). The Invite will identify the address (UE ADD) of user element 16C. Applying the appropriate filter criteria to the Invite will result in the I/S-CSCF 28 forwarding the Invite to the CCF 30 (step 404). Again, the filter criteria may be obtained from the HSS 34, and will direct the I/S-CSCF 28 to invoke the CCF 30 as a service required for call signaling. The CCF 30 may also access information from the HSS 34. The information in the HSS 34 may indicate that user element 16C is being served by the CS 14, and that calls should be routed to the CS client 18 of the user element 16C.

As such, the CCF 30 may invoke a back-to-back user agent and direct the session to the CS 14 via the I/S-CSCF 28 (step 406). Accordingly, an Invite message is sent to the I/S-CSCF 28 (step 408), which will forward the Invite message to the media gateway controller 24 (step 410). The requisite session message exchange will then take place between the media gateway controller 24 and the remote endpoint 36 via the I/S-CSCF 28 and the CCF 30 (step 412). The media gateway controller 24 will then send an IAM to the VMSC 22 via an appropriate gateway mobile switching center (not shown) (step 414). The VMSC 22 will send a Setup message to the CS client 18 of user element 16C (step 416) to indicate that an incoming call is being routed to user element 16C. The CS client 18 of user element 16C will respond by sending a Call Confirmation message to the VMSC 22 (step 418). When the CS client 18 of user element 16C provides an alert to the user, an Alerting message will also be sent back to the VMSC 22 to indicate that the call is being presented to the user (step 420). The VMSC 22 will send an ACM to the media gateway controller 24 (step 422). In response, the media gateway controller 24 will send a 180 Ringing message to the I/S-CSCF 28 (step 424), which will send the 180 Ringing message to the CCF 30 (step 426). The CCF 30 will send the 180 Ringing message back to the I/S-CSCF 28 (step 428), which will send the 180 Ringing message toward the remote endpoint 36 (step 430).

In this fashion, signaling messages are always routed through the CCF 30 by the I/S-CSCF 28, and as such, the CCF 30 can anchor the call for subsequent transfers to other user elements 16M, 16M2, and 16C2. The remote endpoint 36 and the media gateway controller 24 will exchange the PRACK and 200 OK messages via the I/S-CSCF 28 and the CCF 30 (step 432), wherein the MS bearer path is established between the media gateway 26 and the remote endpoint 36 (step 434). When the user of user element 16C answers the incoming call, the CS client 18 of user element 16C will send a Connect message to the VMSC 22 (step 436), which will send an ANM to the media gateway controller 24 via the gateway MSC (step 438). At this point, the CS bearer path is established between the CS client 18 of user element 16C and the media gateway 26 via the VMSC 22 (step 440). In response, the media gateway controller 24 will send a 200 OK message to the I/S-CSCF 28 (step 442), which will send the 200 OK message to the CCF 30 (step 444). The CCF 30 will send the 200 OK message to the I/S-CSCF 28 (step 446), which will send the 200 OK message toward the remote endpoint 36 (step 448). Upon receiving an Acknowledgement message originated at the remote endpoint 36 (step 450), the media gateway controller 24 will instruct the media gateway 26 to effectively connect the CS bearer path and the MS bearer path to form the CS/MS bearer path, which extends between the remote endpoint 36 and the CS client 18 of user element 16C through the media gateway 26 and the VMSC 22 (step 452).

Figure 8A:
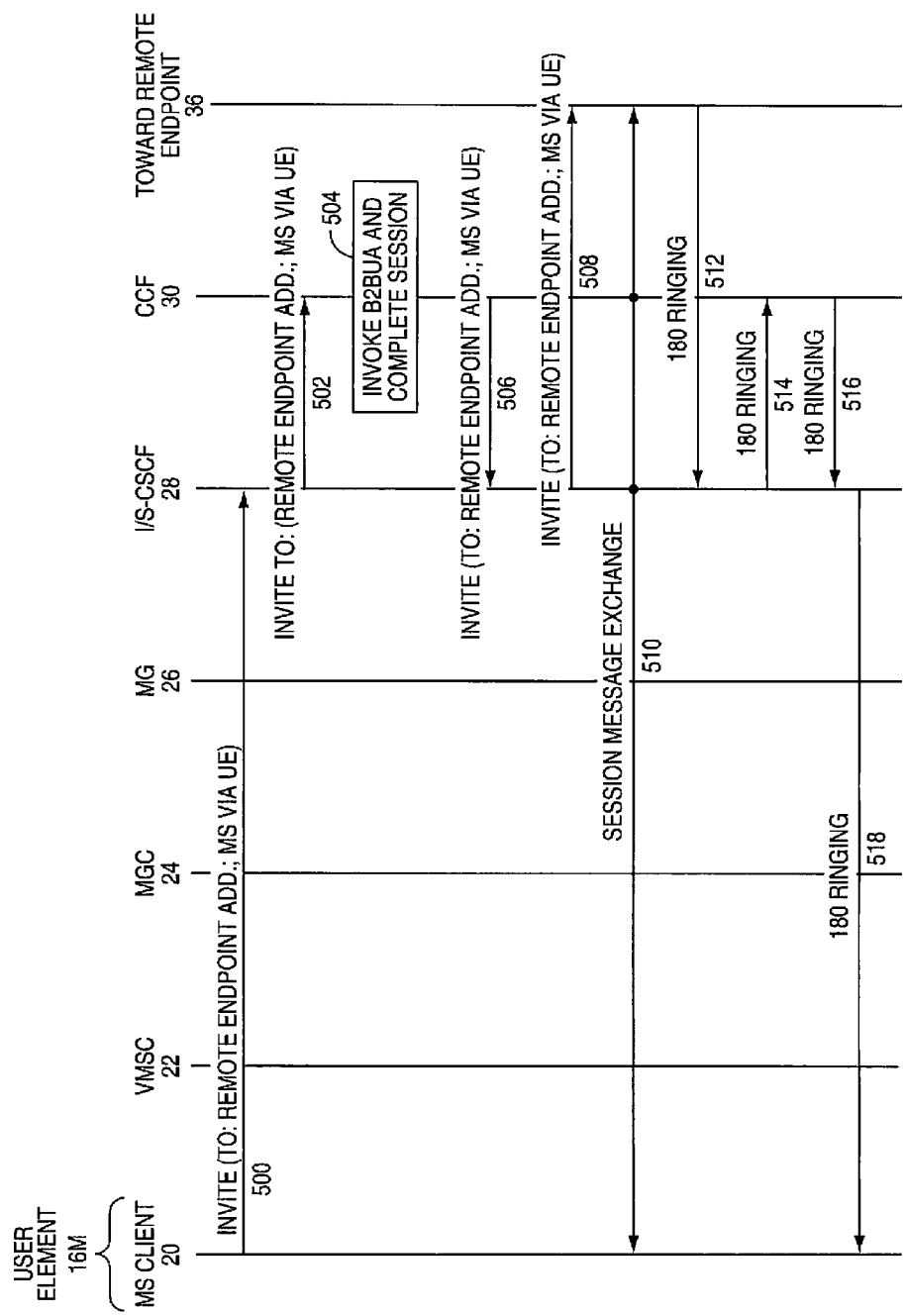
FIGS. 8A and 8B show a communication flow illustrating originating a call via the multimedia subsystem according to one embodiment of the present invention.
Figure 8B:
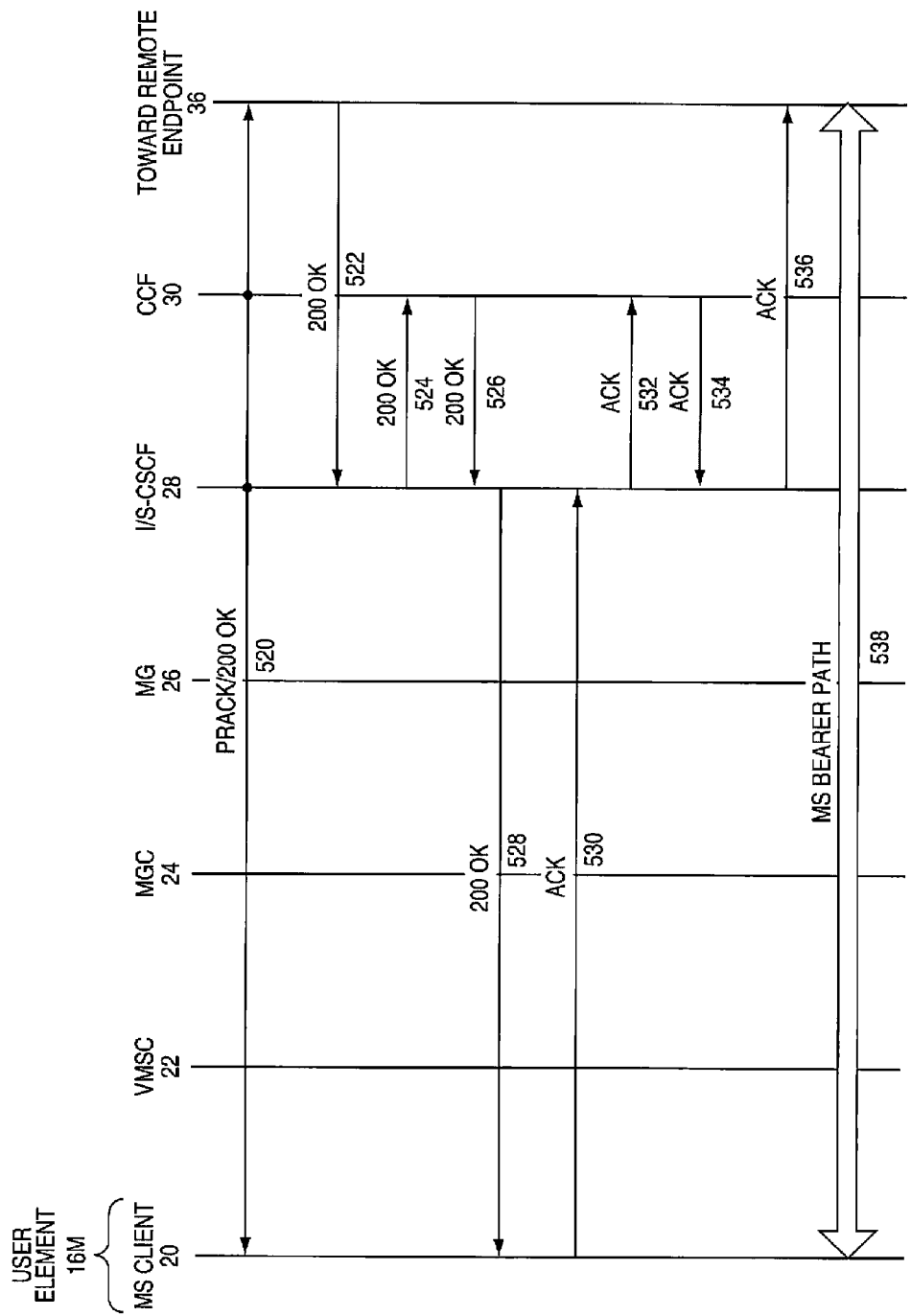

With reference to FIGS. 8A and 8B, a communication flow is provided for originating a call from the MS client 20 of user element 16M. Initially, the MS client 20 of user element 16M will register with the home MS 12, which will result in user element 16M being assigned to the I/S-CSCF 28 (step not shown). To initiate a call, the MS client 20 of user element 16M will send an Invite, which will be directed to the I/S-CSCF 28 (step 500). The Invite will identify the remote endpoint address to which the call is intended, and will include an indication that the call will be supported by the MS client 20 of user element 16M through the home MS 12 (without involving the CS 14). The I/S-CSCF 28 will use the filter criteria associated with user element 16M to determine that call routing should be sent to the CCF 30, and as such, will send the Invite to the CCF 30 (step 502). The CCF 30 may invoke the back-to-back user agent and take the necessary steps to complete the session (step 504). As such, the CCF 30 will send an Invite toward the remote endpoint 36 via the I/S-CSCF 28 (steps 506 and 508). The MS client 20 of user element 16M and the remote endpoint 36 will provide the requisite session message exchange to support an MS bearer path via the I/S-CSCF 28 and CCF 30 (step 510).

Once the call is presented to the remote endpoint 36, the I/S-CSCF 28 will receive a 180 Ringing message (step 512). The 180 Ringing message is sent to the CCF 30 (step 514), which will send the 180 Ringing message back to the IS-CSCF 28 (step 516). Again, the I/S-CSCF 28 will ensure that all call signaling is routed through the CCF 30. The I/S-CSCF 28 will send the 180 Ringing message to the MS client 20 of user element 16M (step 518), wherein the user element 16M and the remote endpoint 36 will exchange the requisite PRACK and 200 OK messages via the I/S-CSCF 28 and the CCF 30 (step 520). When the call is answered at the remote endpoint 36, the I/S-CSCF 28 will receive a 200 OK message (step 522). The I/S-CSCF 28 will route the 200 OK message through the CCF 30 (steps 524 and 526) and then send the 200 OK message to the MS client 20 of user element 16M (step 528). The MS client 20 of user element 16M will respond with an Acknowledgement message, which is received at the I/S-CSCF 28 (step 530). The I/S-CSCF 28 will send the Acknowledgement message through the CCF 30 (steps 532 and 534) and then forward the Acknowledgement message toward the remote endpoint 36 (step 536). At this point, an MS bearer path is established between the MS client 20 of user element 16M and the remote endpoint 36 through the home MS 12, without engaging the CS 14 (step 538). However, all call signaling is routed through the CCF 30 by the I/S-CSCF 28, such that the CCF 30 may remain an anchor for the call in case additional services are required or a transfer to another user element 16C, 16C2, or 16M2 is necessary or desired.

Figure 9:
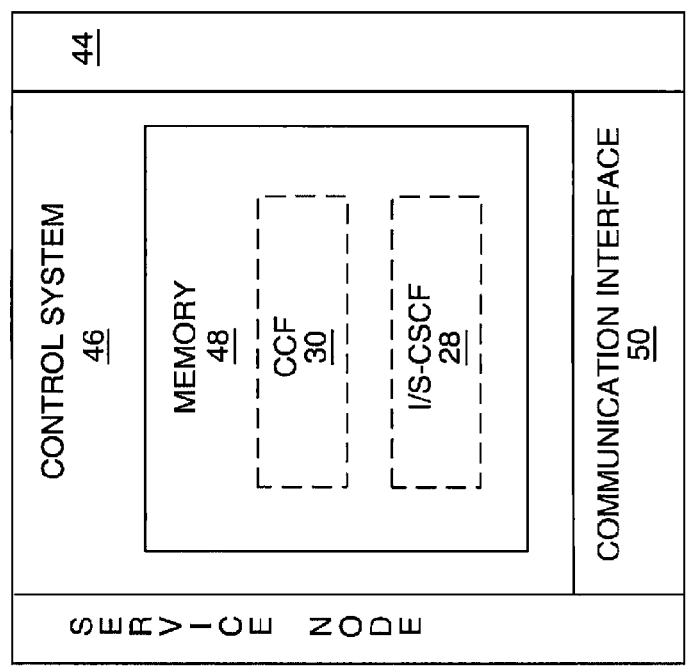
FIG. 9 is a block representation of a service node according to one embodiment of the present invention.

With reference to FIG. 9, a block representation of a service node 44 is provided according to one embodiment of the present invention. The service node 44 may reside in the home MS 12 and include a control system 46 and associated memory 48 to provide the functionality for any one or a combination of the CCF 30 and the I/S-CSCF 28. The control system 46 will also be associated with a communication interface 50 to facilitate communications with any entity affiliated with the home MS 12 or appropriately associated networks.

Figure 10:
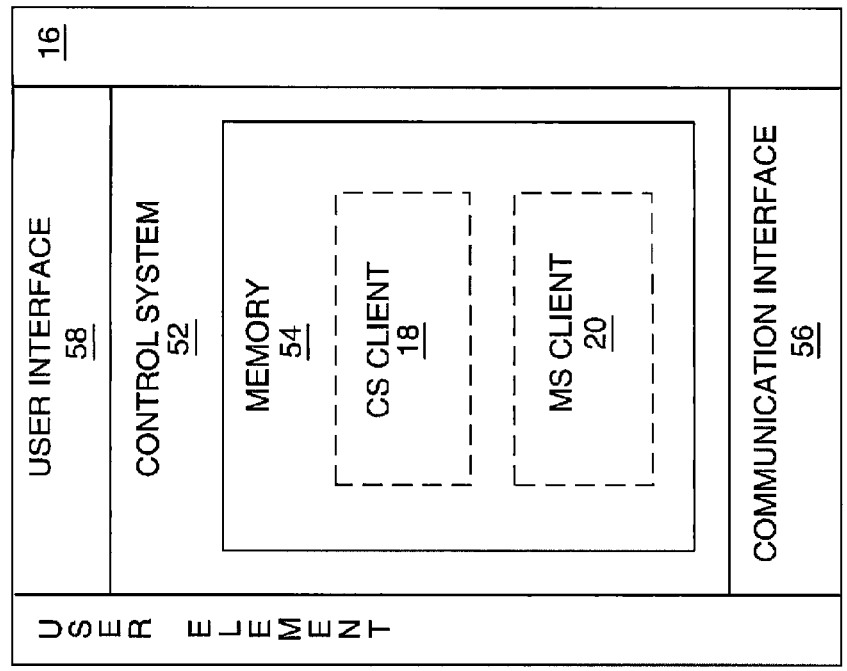
FIG. 10 is a block representation of a user element according to one embodiment of the present invention.

With reference to FIG. 10, a block representation of a user element 16 is provided. The user element 16 may include a control system 52 having sufficient memory 54 to support operation of the CS client 18 and the MS client 20. The control system 52 will cooperate closely with a communication interface 56 to allow the CS client 18 and the MS client 20 to facilitate communications over the CS 14 or the home MS 12 as described above. The control system 52 may also be associated with a user interface 58, which will facilitate interaction with the user. The user interface 58 may include a microphone and speaker to facilitate voice communications with the user, as well as a keypad and display to allow the user to input and view information. The input may include instructions to initiate a call transfer to the user element 16 from another user element 16.

Those skilled in the art will recognize improvements and modifications to the preferred embodiments of the present invention. All such improvements and modifications are considered within the scope of the concepts disclosed herein and the claims that follow.

What is claimed is:
1. A method comprising:
providing a signaling anchor point in a multimedia subsystem for a first access signaling leg and a remote access signaling leg for a call between a first user element and a remote endpoint, the first access signaling leg provided for the first user element;
receiving a request from a second user element not engaged in the call to transfer the call from the first user element to the second user element, wherein receiving the request from the second user element comprises receiving a second call initiated from the second user element and intended for a continuity control function of the multimedia subsystem, such that receipt of the second call is indicative of a need to transfer the call to the second user element;
establishing a second access signaling leg for the second user element, wherein the second call is routed to the continuity control function via the second access signaling leg;

replacing the first access signaling leg with the second access signaling leg, such that the second access signaling leg is anchored at the signaling anchor point; and providing call signaling via the second access signaling leg and the remote access signaling leg to transfer at least a portion of a bearer path connected to the first user element to the second user element.

2. The method of claim 1 wherein receipt of the second call while the call is active is indicative of the need to transfer the call to the second user element.

3. The method of claim 1 wherein the continuity control function resides in a home multimedia subsystem and is invoked as a service by a serving call/session control function for calls from or intended for the first and second user elements.

4. The method of claim 1 wherein the first user element and the second user element are served by a given subsystem.

5. The method of claim 1 wherein the first user element is supported by a transferring-out subsystem and the second user element is supported by a transferring-in subsystem, which is different from the transferring-out subsystem.

6. The method of claim 5 wherein the transferring-out subsystem and the transferring-in subsystem employ different communication techniques.

7. The method of claim 6 wherein one of the transferring-in subsystem and the transferring-out subsystem is the multimedia subsystem and another of the transferring-in subsystem and the transferring out subsystem is a circuit-switched subsystem.

8. The method of claim 7 wherein access to the one of the transferring-in subsystem and the transferring-out subsystem is provided via local wireless access outside of the circuit-switched subsystem.

9. The, method of claim 7 wherein the circuit-switched subsystem is provided by a cellular network.

10. The method, of claim 1 wherein when the call is originated from the first user element, the continuity control function is invoked as a first service of a plurality of services to be provided in a call signaling path formed by the first access signaling leg and the remote access signaling leg, such that all of the plurality of services other than the continuity control function are provided in the remote access signaling leg, and the remote access signaling leg is anchored at the continuity control function, which provides the signaling anchoring point.

11. The method of claim 1 wherein when the call is terminated at the first user element, the continuity control function is invoked as a last service of a plurality of services to be provided in a call signaling path formed by the first access signaling leg and the remote access signaling leg, such that all of the plurality of services other than the continuity control function are provided in the remote access signaling leg, and the remote access signaling leg is anchored at the continuity control function, which provides the signaling anchoring point.

12. The method of claim 1 further comprising coordinating call signaling exchanges for the call via the second access signaling leg and the remote access signaling leg.

13. A method comprising:
providing a signaling anchor point in a multimedia subsystem for a first access signaling leg and a remote access signaling leg for a call between a first user element and a remote endpoint, the first access signaling leg provided for the first user element;
receiving a request from a second user element not engaged in the call to transfer the call from the first user element to the second user element;
establishing a second access signaling leg for the second user element;
replacing the first access signaling leg with the second access signaling leg, such that the second access signaling is anchored at the signaling anchor point; and
providing call signaling via the second access signaling leg and the remote access signaling leg to transfer at least a portion of a bearer path connected to the first user element to the second user element, wherein receiving the request from the second user element comprises receiving a second call initiated from the second user element and intended for a continuity control function of the multimedia subsystem, such that receipt of the second call is indicative of a need to transfer the call to the second user element, wherein receipt of the second call while the call is active is indicative of the need to transfer the call to the second user element, and wherein receipt of the second call when there are no active calls with the first user element and the second user element is indicative of the need to invoke call transfer rules for incoming calls intended for a user who is associated with the first user element and the second user element, and further comprising invoking the call transfer rules in response to receiving the second call when there are no active calls with the first user element and the second user element.

14. A method comprising:
providing a signaling anchor point in a multimedia subsystem for a first access signaling leg and a remote access signaling leg for a call between a first user element and a remote endpoint, the first access signaling leg provided for the first user element;
receiving a request from a second user element not engaged in the call to transfer the call from the first user element to the second user element;
establishing a second access signaling leg for the second user element;
replacing the first access signaling leg with the second access signaling leg, such that the second access signaling leg is anchored at the signaling anchor point; and
providing call signaling via the second access signaling leg and the remote access signaling leg transfer at least a portion of a bearer path connected to the first user element to the second user element, wherein receiving the request from the second user element comprises receiving a second call initiated from the second user element and intended for a continuity control function of the multimedia subsystem, such that receipt of the second call is indicative of a need to transfer the call to the second user element, and wherein the second call is originated from the second user element using at least one of a multimedia subsystem address for the continuity control function, which provides the signaling anchor point, and a directory number within a circuit-switched subsystem, which is associated with the multimedia subsystem address.

15. A node for providing a continuity control function comprising:
a communication interface; and
a control system associated with the communication interface and adapted to:
provide a signaling anchor point in a multimedia subsystem for a first access signaling leg and a remote access signaling leg for a call between a first user element and a remote endpoint, the first access signaling leg provided for the first user element;
receive a request from a second user element not engaged in the call to transfer the call from the first user element to the second user element, wherein receiving the request from the second user element comprises receiving a second call initiated from the second user element and intended for a continuity control function of the multimedia subsystem, such that receipt of the second call is indicative of a need to transfer the call to the second user element;

establish a second access signaling leg for the second user element, wherein the second call is routed to the continuity control function via the second access signaling leg;

replace the first access signaling leg with the second access signaling leg, such that the second access signaling leg is anchored at the signaling anchor point; and provide call signaling via the second access signaling leg and the remote access signaling leg to transfer at least a portion of a bearer path connected to the first user element to the second user element.

16. The node of claim 15 wherein receipt of the second call while the call is active is indicative of the need to transfer the call to the second user element.

17. The node of claim 15 wherein the first user element and the second user element are served by a given subsystem.

18. The node of claim 15 wherein the first user element is supported by a transferring-out subsystem and the second user element is supported by a transferring-in subsystem, which is different from the transferring-out subsystem.

19. The node of claim 18 wherein the transferring-out subsystem and the transferring-in subsystem employ different communication techniques.

20. The node of claim 18 wherein one of the transferring-in subsystem and the transferring-out subsystem is the multimedia subsystem and another of the transferring-in subsystem and the transferring out subsystem is a circuit-switched subsystem.

* * * * *